United States Patent
Christmann et al.

(10) Patent No.: US 11,958,305 B2
(45) Date of Patent: *Apr. 16, 2024

(54) METHOD OF PRODUCING A SPECTACLE LENS AND PRODUCT COMPRISING A SPECTACLE LENS

(71) Applicant: Carl Zeiss Vision International GmbH, Aalen (DE)

(72) Inventors: Michel-Rene Christmann, Aalen (DE); Christian Lischer, Aalen (DE); Andreu Llobera Adan, Cerdanyola del Vallès (ES); Yujing Liu, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,469

(22) Filed: Apr. 21, 2022

(65) Prior Publication Data

US 2022/0242154 A1 Aug. 4, 2022

Related U.S. Application Data

(63) Continuation of application No. PCT/EP2020/079976, filed on Oct. 23, 2020.

(30) Foreign Application Priority Data

Oct. 23, 2019 (EP) .................................... 19204745

(51) Int. Cl.
*B41M 3/00* (2006.01)
*G02C 7/02* (2006.01)

(52) U.S. Cl.
CPC ............... *B41M 3/003* (2013.01); *G02C 7/02* (2013.01)

(58) Field of Classification Search
CPC .......... B41M 3/003; G02C 7/02; G02C 7/022; G02C 7/102; G02C 7/12; B29D 11/00009; B29D 11/00326; B29D 11/00432; B29D 11/00865; B29D 11/00; B29D 11/00028; B29D 11/00269; B29D 11/00317; B29D 11/00336; B29D 11/00346; B29D 11/00355; C03C 17/00; C03C 17/28; C03C 17/30; C03C 17/32; C03C 2203/20; C03C 2203/50; C03C 2217/70; C03C 2217/90; C03C 2218/00; C03C 2218/10; C03C 2218/34
See application file for complete search history.

(56) References Cited

U.S. PATENT DOCUMENTS

| | | | |
|---|---|---|---|
| 3,986,997 A | 10/1976 | Clark | |
| 4,211,823 A | 7/1980 | Suzuki et al. | |
| 4,294,950 A | 10/1981 | Kato | |
| 4,355,135 A | 10/1982 | January | |
| 5,444,503 A | 8/1995 | Kelch et al. | |
| 6,089,713 A | 7/2000 | Hof et al. | |
| 6,538,092 B1 | 3/2003 | Terry et al. | |
| 2003/0049370 A1 | 3/2003 | Lacan et al. | |
| 2004/0220292 A1 | 11/2004 | Momoda et al. | |
| 2006/0066947 A1 | 3/2006 | Henry | |
| 2006/0269741 A1 | 11/2006 | Izumi et al. | |
| 2008/0316558 A1 | 12/2008 | Defranco | |
| 2011/0026118 A1 | 2/2011 | Seesselberg et al. | |
| 2012/0081792 A1 | 4/2012 | Neuffer | |
| 2013/0308189 A1 | 11/2013 | Gloege et al. | |
| 2014/0099439 A1 | 4/2014 | Okubo et al. | |
| 2014/0327876 A1 | 11/2014 | Faul et al. | |
| 2015/0160477 A1 | 6/2015 | Dai | |
| 2016/0306192 A1 | 10/2016 | Marshall et al. | |
| 2017/0131567 A1 | 5/2017 | To et al. | |
| 2017/0174823 A1 | 6/2017 | Weippert | |
| 2017/0297955 A1 | 10/2017 | Gölge | |
| 2019/0310492 A1* | 10/2019 | Gromotka | C08J 7/0423 |
| 2019/0391411 A1 | 12/2019 | Kelch et al. | |
| 2021/0124189 A1 | 4/2021 | Hugenberg et al. | |

(Continued)

FOREIGN PATENT DOCUMENTS

| | | |
|---|---|---|
| CN | 106164753 A | 11/2016 |
| DE | 19848591 A1 | 10/1999 |

(Continued)

OTHER PUBLICATIONS

International Preliminary Report on Patentability issued in PCT/EP2020/079976, to which this application claims priority, dated Feb. 14, 2022, and English-translation thereof.
W. Köppen, "Konzeption und Entwicklung von Gleitsichtgläsern (Conception and development of progressive lenses)," Deutsche Optiker Zeitschrift DOZ, pp. 42-46, Oct. 1995.
European Search Report issued in EP 19 204 745.4, to which this application claims priority, dated May 6, 2020.
International Search Report and Written Opinion issued in PCT/EP2020/079976, to which this application claims priority, dated Jan. 11, 2021.

(Continued)

*Primary Examiner* — William P Fletcher, III
(74) *Attorney, Agent, or Firm* — Tautz & Schuhmacher LLC; Georg Hasselmann

(57) ABSTRACT

A method of producing a spectacle lens includes providing a substrate having a front surface and a back surface and coating or covering at least one of the front surface or the back surface of the substrate, in full or in part, with a layer. The surface topography of the substrate surface is changed by bringing the surface into contact with a medium and the medium is removed. A product made according to the method and including (i) a spectacle lens or (ii) a representation of the spectacle lens in the form of computer-readable data present on a data medium or (iii) a data medium including a virtual representation of the spectacle lens in the form of computer-readable data or (iv) a representation of the spectacle lens in the form of a computer-readable data signal, is also disclosed.

28 Claims, 2 Drawing Sheets

(56) References Cited

U.S. PATENT DOCUMENTS

| | | |
|---|---|---|
| 2021/0141244 A1 | 5/2021 | Kelch et al. |
| 2021/0263341 A1 | 8/2021 | Welscher |

FOREIGN PATENT DOCUMENTS

| | | | | |
|---|---|---|---|---|
| DE | 102012210185 | A1 | 12/2013 | |
| DE | 102015209794 | A1 | 12/2016 | |
| EP | 217502 | A1 | 4/1987 | |
| EP | 562336 | A1 | 9/1993 | |
| EP | 857993 | A2 | 8/1998 | |
| EP | 1392613 | A1 | 3/2004 | |
| EP | 1433814 | A1 | 6/2004 | |
| EP | 1561571 | A1 | 8/2005 | |
| EP | 1602479 | A1 | 12/2005 | |
| EP | 1674898 | A1 | 6/2006 | |
| EP | 1965235 | A1 | 9/2008 | |
| EP | 2437084 | A1 | 4/2012 | |
| EP | 2578649 | A1 | 4/2013 | |
| EP | 2664659 | A1 | 11/2013 | |
| EP | 2801846 | A1 | 11/2014 | |
| EP | 3352001 | A1 | 7/2018 | |
| EP | 3531195 | A1 | 8/2019 | |
| EP | 3531195 | A1 * | 8/2019 | ....... B29D 11/00009 |
| EP | 3663838 | A1 | 6/2020 | |
| JP | 2019078859 | A | 5/2019 | |
| WO | 9417116 | A1 | 8/1994 | |
| WO | 9846692 | A1 | 10/1998 | |
| WO | 02092524 | A1 | 11/2002 | |
| WO | 03058300 | A1 | 7/2003 | |
| WO | 2005050265 | A1 | 6/2005 | |
| WO | 2006034652 | A1 | 4/2006 | |
| WO | 2009029198 | A1 | 3/2009 | |
| WO | 2009056196 | A1 | 5/2009 | |
| WO | 2009156784 | A1 | 12/2009 | |
| WO | 2010075319 | A2 | 7/2010 | |
| WO | 2015121341 | A1 | 8/2015 | |
| WO | 2015160612 | A1 | 10/2015 | |
| WO | 2018026697 | A1 | 2/2018 | |
| WO | 2018076057 | A1 | 5/2018 | |
| WO | 2019166653 | A1 | 9/2019 | |
| WO | 2019166654 | A1 | 9/2019 | |
| WO | 2019166655 | A1 | 9/2019 | |
| WO | 2019166657 | A1 | 9/2019 | |
| WO | 2019166659 | A1 | 9/2019 | |
| WO | 2020016378 | A1 | 1/2020 | |
| WO | 2021010984 | A1 | 1/2021 | |

OTHER PUBLICATIONS

Written opinion issued in PCT/EP2020/079976, to which this application claims priority, dated Sep. 23, 2021.

Office Action by the Chinese Patent Office (SIPO) issued in CN 202080089598.X, which is a counterpart hereof, dated Sep. 7, 2022, and English translation thereof.

Office Action by the Indian Patent Office issued in IN 202217026658, which is a counterpart hereof, dated Sep. 16, 2022.

Office Action by the Japanese Patent Office issued in JP 2022-524055, which is a counterpart hereof, dated Oct. 25, 2022, and English translation thereof.

Industrial Norm "Ophthalmic optics—Spectacle lenses—Vocabulary (ISO 13666:2012)," German and English version EN ISO 13666:2012, Oct. 2013.

Industrial Norm "Ophthalmic optics—Uncut finished spectacle lenses—Part 2: Specifications for power-variation lenses," ISO 8980-2, Jul. 2017.

* cited by examiner

METHOD OF PRODUCING A SPECTACLE LENS AND PRODUCT COMPRISING A SPECTACLE LENS

CROSS REFERENCE TO RELATED APPLICATIONS

This application is a continuation application of international patent application PCT/EP2020/079976, filed Oct. 23, 2020, designating the United States and claiming priority from European patent application 19 204 745.4, filed Oct. 23, 2019, both of which are hereby incorporated by reference in their entireties.

TECHNICAL FIELD

The present disclosure relates to a method of producing a spectacle lens and a product comprising (i) a spectacle lens or (ii) a representation of the spectacle lens in the form of computer-readable data located on a data medium or (iii) a data medium with a virtual representation of the spectacle lens in the form of computer-readable data or (iv) a representation of the spectacle lens in the form of a computer-readable data signal.

BACKGROUND

Defocusing of the eye of the user can lead to a refractive error (ametropia) of the user, in particular to nearsightedness (myopia) or farsightedness (hyperopia) of the user. An increased prevalence of myopia, particularly in children and adolescents, can be observed in Asian countries in particular, with the myopia being caused in approximately 80% of cases by an increased eye length growth. As a rule of thumb, a lengthening of the eyeball of approximately 1 mm leads to a refractive error of approximately three diopters (dpt).

US 2017/0131567 A1 has disclosed a spectacle lens which has on the object side a first region with a first refractive power and a second region with a refractive power different from the first refractive power. The first region is intended to serve for correcting the visual acuity of the eye. The second region is intended not to image an object on the retina and thus suppress progress of malformations of the eye. This second region comprises a plurality of concavely or convexly formed island-shaped regions, which are arranged on a circular area with a radius of 20 mm around the center of the spectacle lens. Each of these island-shaped, circular regions has an area of 0.50 to 3.14 $mm^2$, and a diameter of 0.8 to 2.0 mm. A circular region with a radius of 2.5 to 10 mm about the center of the spectacle lens may comprise no island-shaped regions. The spectacle lens is intended to be sufficiently pellucid while simultaneously suppressing the progress of myopia. US 2017/0131567 A1 does not disclose a production method for such a spectacle lens.

WO 2006/034652 A1 discloses various methods for treating progressing myopia or hyperopia. One of these methods comprises the provision of a Fresnel lens which has first optical zones with a first refractive power and second optical zones with a second refractive power. The first refractive power should correct the refractive error of the eye and the second refractive power should generate at least a defocusing in front of or behind the retina. Another one of these methods comprises the provision of an optical system which comprises a back layer and a partly transparent front layer. This optical system allows a first image of one of these layers to be imaged on the retina and allows a second image of the other layer to be generated, this other image being defocused in front of or behind the retina. Another one of these methods comprises a lens which comprises a central zone with a first refractive power and at least one peripheral zone with a second refractive power. The first optical zone is intended to focus a light ray of a central object on the retina and the second optical zone is intended to focus a light ray of a peripheral object in front of or behind the retina. Another one of these methods comprises an optical system which has a central object and at least one peripheral object. A first image of the central object is intended to be imaged on the retina and a second image of the peripheral object is intended to be imaged in front of or behind the retina. Another one of the disclosed methods comprises the generation of a first image on the retina and the generation of a second defocused image. WO 2006/034652 A1 does not disclose a production method for the lenses described therein.

In FIG. 11, WO 2010/075319 A2 discloses a pair of spectacles which comprise spectacle lenses with small elevations, small depressions, or with light-transmissive or transparent inclusions. The inclusions are intended to have a refractive index that differs from the remaining spectacle lens material. These elevations, depressions or inclusions on or in the spectacle lenses should lead to the user obtaining an out-of-focus image as a result. In a first pair of spectacles, one of these spectacle lenses may have an area allowing sharp focusing such that the user can read or carry out everyday activities. In a second pair of spectacles, intended to be worn in alternation with the first pair of spectacles, the respective other spectacle lens may likewise have an area facilitating sharp focusing. The blur generated by such a spectacle lens for example depends on the arrangement, the density or the dimensions of the elevations, the depressions or the inclusions, or on the material of the inclusions. Alternatively, the blur may be caused by light scattering at small particles within the spectacle lens or by way of a coating on the spectacle lens. An inverse progressive-power lens, which has negative correction at the upper edge and more negative correction at the lower edge of the spectacle lens, may also facilitate blur over the whole field of vision. WO 2010/075319 A2 does not disclose a production method for the spectacle lenses depicted in FIG. 11.

US 2015/0160477 A1 discloses a lens comprising a plurality of elements, the lens comprising a large convex lens and at least one small concave lens.

WO 2018/076057 A1 discloses a spectacle lens which comprises a main lens for at least partial correction of the refractive error of the eye, and at least one microlens array. The spectacle lens is intended to stop or reduce the longitudinal growth of the eye. The fact that the pattern or grid of the microlens array, the diameter, the height, the refractive index and/or the focal length of the microlenses and/or the spacing between the microlenses can be altered is described as advantageous in WO 2018/076057 A1. The microlens array may be constructed from more than one layer, for example a layer made of a transparent film and a layer made of a polymer, or may be molded as part of the spectacle lens. The microlens array may be bonded to the main lens by means of an adhesive means or mechanically, or may be part of the main lens. The percentage component of the complete surface of the spectacle lens covered by the area comprising microlenses may range between 10% and 80%. By way of example, the microlenses may be available in circular, oval, rectangular, hexagonal, or square shape. The center-to-center distance between at least two microlenses can be at least 0.05 to 8 mm.

WO 2018/026697 A1 discloses a spectacle lens comprising a point pattern. The point pattern comprises elevations or depressions on the surface of the spectacle lens, these elevations or depressions being distributed in regular or irregular fashion over the surface of the spectacle lens. The individual points, whose maximum dimension is ≤0.3 mm, have a distance of ≤1 mm from one another. The points can be circular or have any desired shape. The distance between the individual points within the point pattern may be the same in each case or may be different from one another in each case. The spectacle lens does not have a point pattern in a region of more than 1 mm about the line of sight. Starting from the region without a point pattern and going to the spectacle lens edge, the points may have the same dimension. The points may also become larger or smaller with increasing distance from the region without a point pattern. In comparison to the region without the point pattern, the contrast of an object can be reduced by at least 30% when looking through the point pattern. Should the individual points be elevations on the surface of the spectacle lens, these can be produced by means of inkjet printing, pad printing, screen printing, transfer printing, lithographic printing or hot stamping, for example. The elevations may further be produced by casting the spectacle lens using a suitable mold or may be a constituent part of a film that is to be applied to the surface of the spectacle lens. Should the points be depressions in the surface of the spectacle lens, these can be produced by means of etching or ablating material from the surface of the spectacle lens, for example. Furthermore, the depressions may also be produced by casting the spectacle lens by means of a suitable mold. Instead of elevations or depressions, the points may also be inclusions in the spectacle lens. The point pattern can be individually adjusted for each patient depending on the desired contrast reduction outside of the region without a point pattern.

JP 2019078859 A discloses a spectacle lens intended to correct presbyopia. This spectacle lens comprises microlenses with different focusing power. By way of example, the dioptric power can reduce from the center toward the edge of the spectacle lens. The microlenses with different focusing power should allow the spectacles wearer always to be able to view through a region in the spectacle lens through which a sharp image is obtained, for different near distances and independently of the form of the spectacles wearer on the day. The microlenses can have a hexagonal shape and should be present on the spectacle lens directly adjacent to one another or with small spaces therebetween. Instead of the hexagonal shape, the microlenses may also be present as a triangle, quadrilateral, circle or ellipse.

WO 2019/166653 A1 discloses a lens element which comprises a region with a refractive power based on the prescription for the eye and a plurality of at least three noncontiguous optical elements. At least one of these optical elements is intended to have a non-spherical optical power, which does not have a single focal point, and consequently is intended to slow down the progress of myopia or hyperopia. Furthermore, at least one of these optical elements can be a multifocal, toric or diffractive microlens, which is arranged on the front surface or the back surface of the lens element, optionally in separable fashion. The optical elements should have a shape and be surrounded by a circumference with a diameter ≥0.8 mm and ≤3.0 mm. By way of example, the optical elements may be arranged as concentric rings on a surface of the lens element. According to WO 2019/166653 A1, the noncontiguous optical elements can be produced in various ways, for example by surface treatment, casting, stamping or photolithography.

WO 2019/166654 A1 discloses a lens element which comprises a region with a first refractive power based on the prescription for the eye and a second refractive power that differs from the first refractive power, and a plurality of at least three optical elements. At least one of these lens elements is intended to not focus an image on the retina of the eye in order to slow down the progress of an abnormal refraction of the eye. The difference between the first refractive power and the second refractive power is ≥0.5 D. If myopia is present, the second refractive power is intended to focus light rays in front of the retina of the eye which, in conjunction with the optical elements, should lead to a slowing down of the progress of myopia or hyperopia. Typically, at least 50% of the optical elements should not focus an image on the retina. According to WO 2019/166654 A1, the optical elements can be produced for example by surface treatment, casting, stamping or photolithography.

WO 2019/166655 A1 discloses a lens element which comprises a region with a refractive power based on the prescription for the eye and a plurality of at least three optical elements. The optical elements are such that along at least one section of the lens element, the mean sphere of the optical elements increases from a point in this section in the direction of the periphery of the section. This increase is intended to amplify the defocusing of a light ray in front of the retina in the case where myopia is present or behind the retina in the case where hyperopia is present, and thus slow down the progress of myopia or hyperopia. Moreover, the mean cylinder along at least one section of the lens element can also increase from a point in this section in the direction of the periphery of this section. According to WO 2019/166655 A1, the optical elements can be produced for example by surface treatment, casting, stamping, additive manufacturing or photolithography.

WO 2019/166657 A1 discloses a lens element which provides a region with a first refractive power on the basis of the prescription for a spectacles wearer under standard wear conditions for foveal vision, and furthermore comprises a plurality of at least three optical elements. At least one of these optical elements is intended to not image an image on the retina under standard wear conditions and for peripheral vision, and thus slow down the progress of a visual defect. Furthermore, WO 2019/16657 A1 discloses a method for determining a lens element, which is intended to slow down a visual defect. This method comprises making available the prescription data, the wear conditions, the retinal data and, on the basis of this, the determination of the lens element. According to WO 2019/166657 A1, the optical elements can be produced for example by surface treatment, casting, stamping or photolithography.

WO 2019/166659 A1 discloses a lens element which comprises a region with a refractive power based on the prescription for the eye and a plurality of at least two optical elements. At least one of these optical elements is intended to not focus an image on the retina of the eye so that the progress of an abnormal refraction is slowed down. The at least two contiguous optical elements are intended to be independent of one another, that is to say image independent images. Should the surface on which the at least two optical elements are arranged be spherical, two optical elements are contiguous if there is a path from one element to the other on which the spherical surface is not touched. A corresponding statement applies to non-spherical surfaces which are approximated by a spherical surface. Contiguous optical elements are intended to improve the appearance of the lens element and be more easily producible. According to WO 2019/166659 A1, the optical elements can be produced for example by surface treatment, casting, stamping or photolithography.

EP 3 531 195 A1 discloses a method for producing a nanostructured and/or microstructured surface of a spectacle lens. To this end, the surface of the spectacle lens to be coated is masked by means of at least one layer of nanoparticles and/or microparticles. Subsequently, the surface to be coated is coated with at least one layer at those locations where no nanoparticles and/or microparticles are present, and the nanoparticles and/or microparticles themselves are also coated with the at least one layer. Once the nanoparticles and/or microparticles have been removed from this at least one further applied layer, the latter remains as a nanostructured and/or microstructured layer.

US 2014/0099439 A1 discloses a spectacle lens which has an elevation, a depression or a coloring on one surface. The elevation or the depression is obtained by means of an appropriate masking layer, which can be applied to the surface to be coated by means of an inkjet method. Alternatively, the masking layer can also be formed by the attachment of a film. After the masking layer, which for example has a cutout at that position where a transparent pattern in the form of an elevation is intended to be applied to the surface to be coated, has been cured, at least one transparent material is applied both to the masking layer and to the surface to be coated. The transparent material to be applied, which for example serves to form an island-shaped pattern or logo, may be for example a light-transmissive material which has a higher refractive index than the two directly adjacent layers. After the removal of the masking layer together with the transparent material applied thereto, for example a multi-layer antireflection layer and a hydrophobic film is applied, pursuant to, to the surface to be coated. If the transparent pattern is intended to be present in the form of a depression, a multi-layer antireflection layer and a hydrophobic film is applied following the application of the masking layer.

US 2019/0310492 A1 discloses a method for producing a reflection image by means of a multi-layer coating, for example an antireflection layer or a reflection layer. The reflection image is brought about by differences in the reflection properties which, in turn, are caused by previous masking.

US 2008/0316558 A1 discloses a method for applying a transferable material by means of a stamp. The surface of the stamp has elevations and depressions which represent a micro-relief that corresponds to the pattern to be transferred. The stamp with the material to be transferred is brought into contact with a non-dried latex layer, which may completely cover the surface of an optical object. The stamp with the material to be transferred is brought into contact with the latex layer in such a way that only the material to be transferred that is situated on the elevations of the stamp is transferred to the latex layer. Alternatively, the stamp with the material to be transferred is brought into contact with the latex layer in such a way that both the material to be transferred that is situated on the elevations and the material to be transferred that is situated in the depressions is transferred to the latex layer. The material to be transferred can be a metallic material.

SUMMARY

It is an object of the present disclosure to provide an alternative method for producing one of the spectacle lenses described previously in the prior art. Moreover, it was an object of the present disclosure to provide an alternative method which requires no mechanical processing step for obtaining the dioptric power or for obtaining the final surface topography.

This object was achieved by providing a method of producing a spectacle lens having a substrate and at least one coating as disclosed. This object was further achieved by providing a product according to this method.

The substrate may comprise at least one polymeric material and/or at least one mineral glass, wherein the polymeric material or mineral glass may each take the form of a semi-finished lens blank, i.e., of a lens blank having only one optically finished surface pursuant to DIN EN ISO 13666: 2013-10, paragraph 8.4.2, or of a finished lens, i.e., of a lens of which both sides have their final optical surface before or after edge processing pursuant to DIN EN ISO 13666:2013-10, paragraph 8.4.6. The semi-finished lens blanks may take the form of single-vision semi-finished lens blanks, multifocal semi-finished lens blanks or progressive-power semi-finished lens blanks according to DIN EN ISO 13666:2013-10, paragraphs 8.4.3, 8.4.4 and 8.4.5. The finished lenses may be single-vision lenses, multifocal lenses, bifocal lenses, trifocal lenses, progressive-power lenses or degressive-power lenses pursuant to DIN EN ISO 13666:2013-10, paragraphs 8.3.1, 8.3.2, 8.3.3, 8.3.4, 8.3.5 and 8.3.6. The semi-finished lens blanks or finished lenses usable as substrate may be based, for example on the base materials specified in table 1 below.

TABLE 1

Examples of base materials for semi-finished lens blanks or finished lenses

| Trade name | Base material | Average refractive index n* | Abbe number v* |
|---|---|---|---|
| CR 39, CR 330, CR 607, CR 630, RAV 700, 7NG, 7AT, 710, 713, 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan | Polycarbonate (PC) | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

The opposite face of the semi-finished lens blank from the optically finished face may, before or after the coating of the optically finished face of the semi-finished lens blank, typically be converted by mechanical processing, for example milling and/or grinding and/or turning and/or polishing, to the second optically finished face. This mechanical processing typically precedes the coating of the semi-finished lens blank.

The substrate is typically a finished lens.

The substrate may not have an optical correction effect. Alternatively, the substrate may be endowed with an optical correction effect and/or an aberration correction for the viewing eye. Optical correction effect is understood to mean spherical correction, astigmatic correction and correction of the axis position and optionally correction by a prism with a base setting. This optical correction effect is conventionally implemented for distance viewing or close viewing in single-vision lenses. In the case of multifocal lenses, bifocal lenses, trifocal lenses, progressive-power lenses or degressive-power lenses, the optical correction effect for distance vision and/or for near vision may in each case include a spherical correction, an astigmatic correction, a correction of the axis and optionally a correction by a prism with a base setting. Aberration correction for the viewing eye, regardless of whether the aberration correction is for near vision or distance vision, is typically calculated analogously to Werner Köppen "Konzeption and Entwicklung von Gleitsichtgläsern" [Design and Development of Varifocal Lenses], Deutsche Optiker Zeitschrift DOZ, October 1995, pages 42-45. For this purpose, the surface properties of at least one substrate surface, in an optimization process, are varied by iteration until a desired aberration distribution for the viewing eye has been attained within a defined tolerance, i.e. until the merit function has gone below a defined value.

The substrate can be produced either by means of primary forming and subsequent mechanical processing, for example milling and/or grinding and/or turning and/or polishing, or, in the case of substrates based on at least one polymeric material, by means of an additive manufacturing method. In the production of a substrate based on at least one polymeric material, typically by means of an additive manufacturing method, the substrate may have a uniform refractive index, for example as listed in table 1 above, or a location-dependent refractive index distribution. The location-dependent refractive index distribution is typically calculated and optimized beforehand by means of optical calculation programs, for example ZEMAX (from Zemax LLC). For the calculation, the position of the substrate in front of the eye intended, the interpupillary distance, the pantoscopic tilt of the substrate, the face form angle of the substrate and the substrate size must typically be known. Furthermore, the calculation of multifocal lenses, bifocal lenses, trifocal lenses, progressive-power lenses and degressive-power lenses is based in particular on an object distance model which describes the position of object points in the spectacles wearer's field of view relative to the centers of rotation of the wearer's eyes. A progressive-power lens with a location-dependent refractive index distribution, usable as a substrate for example, is disclosed in EP 3 352 001 A1, in particular in claim 1 or claim 1 amended pursuant to Rule 137(2) EPC of EP 3 352 001 A1, or in PCT/EP2019/069422, in particular in claim 1 of PCT/EP2019/069422.

If the substrate comprises both at least one polymeric material and at least one mineral glass, the mineral glass typically takes the form of a thin glass, and the polymeric material typically takes the form of a semi-finished lens blank or of a finished lens or of at least one polymer film. The semi-finished lens blank or the finished lens may also be produced by means of an additive manufacturing method in the case of this exemplay embodiment and may have either a uniform refractive index or a location-dependent refractive index distribution. If, in this exemplay embodiment, the substrate comprises at least one thin glass as mineral glass and at least one polymer film as polymeric material, the at least one polymer film is typically disposed between at least two thin glasses. The at least one polymer film is typically based on polyethylene, polypropylene, polyethylene terephthalate, polycarbonate, polymethylmethacrylate, polyvinyl chloride, polyvinyl acetate, polyvinyl butyrate and/or mixtures thereof. The at least one polymer film may be stabilized with cellulose triacetate, for example. The at least one polymer film may be colored or uncolored. If the substrate that comprises at least a polymer film and at least a thin glass is to be colored, the at least one polymer film is typically colored. The at least one polymer film typically has an average thickness from a range from 9 µm to 205 µm, more typically from a range from 14 µm to 103 µm.

If, in this exemplay embodiment, the substrate comprises at least one thin glass as mineral glass and at least one finished lens as polymeric material, at least one thin glass may be on the front surface and/or on the back surface of the finished lens. Typically, there is at least one thin glass both on the front surface and on the back surface of the finished lens.

If, in this exemplay embodiment, the substrate comprises at least one thin glass as mineral glass and at least one semi-finished lens blank as polymeric material, preference is given to first processing the optically unfinished surface and then bonding the front surface and/or the back surface of the finished lens thus obtained to at least one thin glass. Alternatively, in the case of use of a semi-finished lens blank as polymeric material, the at least one thin glass is bonded to the already finished optical surface, the optically unfinished surface is processed, and then this processed surface is optionally bonded to at least one further thin glass. Bonding to at least one further thin glass is typical here. Typically, the finished optical surface of the semi-finished lens blank is the front surface thereof, and the optically unfinished surface is the back surface thereof. As an alternative to the conversion of the optically unfinished surface into a second optically finished surface and the subsequent bonding thereof to at least one thin glass, this second surface, after conversion into a second optically finished surface, may be provided with at least one coating. This coating is typically selected from the group consisting of at least one hardcoat layer, at least one antireflection layer, at least one antifog layer, at least one electrically conductive or electrically semiconducting layer, and at least one cleancoat layer. Particular preference is given to the coating comprising at least one hardcoat layer, at least one antireflection layer and at least one cleancoat layer, in which case the at least one hardcoat layer is the layer closest to the substrate and the at least one cleancoat layer is the layer furthest removed from the substrate.

The at least one thin glass bonded to the front surface of the finished lens may be identical or different, for example in respect of glass composition, average thickness, surface topography, radius of curvature and/or shape, to the at least one thin glass bonded to the back surface of the finished lens. The same also applies in the case of use of at least one semi-finished lens blank or at least one polymer film as polymeric material. In the case of use of a semi-finished lens blank, the optically unfinished surface, prior to the bonding to at least one thin glass, is converted to an optically finished surface.

The bonding of the at least one thin glass to the optically finished surface, typically the front surface, of the semi-finished lens blank, or to one of the finished optical surfaces, typically the front surface, of the finished lens is typically cohesive and form-fitting. Typically, the back surface of the at least one thin glass is bonded to the optically finished front surface of the semi-finished lens blank or of the finished lens. The back surface of the at least one thin glass and/or the optically finished front surface of the semi-finished lens blank or of the finished lens may be provided with at least one coating. This at least one coating may comprise at least one coloring layer, at least one photochromic layer and/or at least one polarizing layer. The at least one coloring layer typically comprises a colorable layer according to U.S. Pat. No. 4,355,135 A, in particular according to claim 1 of U.S. Pat. No. 4,355,135 A, according to U.S. Pat. No. 4,294,950 A, in particular according to either of claims 1 and 6 of U.S. Pat. No. 4,294,950 A, or according to U.S. Pat. No. 4,211,823 A, in particular according to either of claim 1 or 2 of U.S. Pat. No. 4,211,823 A. More typically, the coloring layer comprises a colorable layer according to U.S. Pat. No. 4,355,135 A, particularly typically according to claim 1 of U.S. Pat. No. 4,355,135 A. The at least one photochromic layer typically comprises a layer according to U.S. 2006/0269741 A1, in particular according to US 2006/0269741 A1, claim 6, or a layer according to US 2004/0220292 A1, in particular according to US 2004/0220292 A1, claim 1. The at least one photochromic layer typically has an average thickness from a range from 5 µm to 200 µm, further typically from a range from 9 µm to 166 µm, more typically from a range from 17 µm to 121 µm and most typically from a range from 21 µm to 81 µm. The at least one polarizing layer typically comprises either a polarization film or a layer having polarizing properties. The polarization film used may be a film of polyvinyl alcohol or polyethylene terephthalate, for example, comprising dichroic colorants. The polarization film may have a monolayer or multilayer film structure. The polarization film may have been preformed to accurately fit the back surface of the at least one thin glass. Typically, the polarization film is preformed with application of reduced pressure with the aid of a mold, typically a metal mold. A layer having polarizing properties is disclosed, for example, in EP 1 965 235 A1, EP 0 217 502 A1, EP 1 674 898 A1, US 2006/0066947 A1, WO 2005/050265 A1, WO 2009/029198 A1, WO 2009/156784 A1 or WO 2015/160612 A1. In the aforementioned applications, the layer having polarizing properties is in each case a constituent of a layer sequence described therein. In the context of this disclosure, typically only the layer having polarizing properties which is described in the applications cited is used as polarizing layer.

There is typically only a single layer selected from at least one coloring layer, at least one photochromic layer and at least one polarizing layer between the back surface of the at least one thin glass and the optically finished front surface of the semi-finished lens blank or of the finished lens. If there are multiple layers between the back surface of the at least one thin glass and the optically finished front surface of the semi-finished lens blank or of the finished lens, these are in the following typical sequences from the object side to the eye side:

thin glass/photochromic layer/polarizing layer/coloring layer/semi-finished lens blank or finished lens or
thin glass/photochromic layer/coloring layer/polarizing layer/semi-finished lens blank or finished lens or
thin glass/polarizing layer/coloring layer/semi-finished lens blank or finished lens.

If at least one polymer film is used as polymeric material, the above-described at least one coloring layer, at least one photochromic layer and/or at least one polarizing layer is/are typically applied to the back surface of the thin glass. If the back surface of the thin glass comprises two or more of these layers, the sequence thereof between thin glass and the at least one polymer film corresponds to the above-described sequences between thin glass and semi-finished lens blank or finished lens.

Particularly typically, there is no layer between the back surface of the at least one thin glass and the optically finished front surface of the semi-finished lens blank or of the finished lens.

The optional bonding of the second, finished optical surface of the semi-finished lens blank or of the finished lens to at least one further thin glass is typically likewise cohesive and form-fitting. Typically, the optically finished back surface of the semi-finished lens blank or of the finished lens is bonded here to the front surface of the at least one thin glass. The optically finished back surface of the semi-finished lens blank or of the finished lens and/or the front surface of the at least one thin glass may have been provided with at least one coating. This at least one coating typically comprises a coloring layer. The coloring layer has already been defined above. Typically, the optically finished back surface of the semi-finished lens blank or of the finished lens and/or the front surface of the at least one thin glass does not comprise any coating. As alternative to the bonding of the optically finished back surface of the semi-finished lens blank or the back surface of the finished lens to at least one thin glass, the respective back surface may be provided with at least one coating. This coating is typically selected from the group consisting of at least one hardcoat layer, at least one antireflection layer, at least one antifog layer, at least one electrically conductive or electrically semiconducting layer, and at least one cleancoat layer. More typically, the coating comprises at least one hardcoat layer, at least one antireflection layer and at least one cleancoat layer, in which case the at least one hardcoat layer is the layer closest to the substrate and the at least one cleancoat layer is the layer furthest removed from the substrate.

The front surface and/or the back surface of the at least one thin glass can each be coated by means of a PVD method, a dip-coating method and/or a spin-coating method. The subsequent curing of the coating obtained by the spin-coating method and/or dip-coating method can be effected either thermally or by radiation curing. Typically, this coating is cured by radiation curing.

The bonding of the respectively optically finished surface of the semi-finished lens blank or of the at least one finished optical surface of the finished lens or of the at least one polymer film to the at least one thin glass in each case is typically effected by an adhesive means. The adhesive means may serve here, for example, as primer or compensation material for the different thermal expansion of the individual components. Further, if the semi-finished lens blank or the finished lens has a uniform refractive index, the selection of the adhesive means can bring about matching of a possibly present refractive index difference $\Delta nD$ between the individual components. What is typically effected here is not just the matching of the refractive index nD but also the matching of the Abbe number, such that the change in the refractive index of the individual components is the same across the visible spectrum. Usable adhesive means are described, for example, in DE 10 2012 210 185 A1, WO 2009/056196 A1 or WO 2015/121341 A1. Typically, the individual components are bonded to one another by means of an adhesive means based on an amine-catalyzed thiol hardening of epoxy resins analogously to WO 2015/121341 A1, especially analogously to claim 1 of WO 2015/121341 A1, at a temperature from a range from 20° C. to 80° C., typically from a range from 40° C. to 70° C. and more typically from a range from 45° C. to 65° C.

There may be at least one layer between the surface of the at least one thin glass facing the finished optical surface of the semi-finished lens or of the finished lens and the finished optical surface. This at least one layer typically has the same surface topography as the respective surface beneath to which this at least one layer has been applied. Slight differences in the surface topography of the two surfaces to be joined to one another can be filled, for example, by means of an adhesive means. For form-fitting bonding of the respective surfaces, it is preferable that the radii of curvature of the components to be respectively bonded to one another typically differ from one another by less than 1 mm, further typically within a range from 0.03 mm to ≤0.8 mm, more typically within a range from 0.04 mm to ≤0.7 mm and most typically within a range from 0.05 mm to ≤0.6 mm.

The at least one thin glass and the semi-finished lens blank or the finished lens, before being joined by means of an adhesive means, typically have the same diameter and the same radius of curvature. Typically, the at least one polymer film has a diameter sufficiently great that the at least one polymer film completely covers the front surface of the eye-side thin glass and the back surface of the object-side thin glass. Any excess polymer film is typically cut off. If the at least one polymer film already has the same radius of curvature as the thin glass to be bonded thereto, the at least one polymer film typically has the same diameter as the thin glass.

If the substrate comprises at least two mineral glasses, one of the mineral glasses is typically in the form of thin glass and the other mineral glass is typically in the form of a semi-finished lens blank or finished lens. What was described above applies in relation to thin glasses and their optional front-side and/or back-side coating. Typically, the at least one thin glass is bonded to the optically finished surface of the semi-finished lens blank, typically the front surface thereof, or bonded to at least one of the optically finished surfaces of the finished lens, typically the front surface thereof. Typically, both the front surface and the back surface of a finished lens are each bonded to at least one thin glass. Further typically, once the surface opposite to the optically finished surface of the semi-finished lens blank has been processed, it too is bonded to at least one thin glass. Bonding to at least one thin glass can be implemented by optical contact bonding or by means of an adhesive means, typically by means of an adhesive means. The adhesive means listed above may be used as an adhesive means. The back surface of the at least one thin glass and/or the front surface of the semi-finished lens blank or the front surface of the finished lens may be provided with at least one coating prior to being joined. By way of example, this coating may comprise at least one polarizing layer and/or at least one photochromic layer. A polarizing layer and a photochromic layer have already been described. The back surface of the semi-finished lens blank or the back surface of the finished lens and/or the front surface of the at least one thin glass may also be provided with at least one coating prior to being joined. This coating may be at least one coloring layer, for example. A coloring layer has likewise already been described above.

If only the front surface or only the back surface of the semi-finished lens blank or of the finished lens is respectively bonded to at least one thin glass in this exemplay embodiment, the respectively opposite surface, provided that it is optically finished, may have at least one coating as an alternative to the aforementioned bonding to at least one thin glass. This coating may comprise at least one antireflection layer, at least one antifog layer, at least one electrically conductive or electrically semiconducting layer and/or at least one cleancoat layer. Typically, this coating comprises at least an antireflection layer and at least one cleancoat layer. In this case, the cleancoat layer is the layer located furthest away from the surface to be coated.

If the substrate is or comprises at least one thin glass, the latter typically has a mean thickness from a range from 10 μm to 1000 μm, further typically from a range from 13 μm to 760 μm, further typically from a range from 16 μm to 510 μm, more typically from a range from 18 μm to 390 μm and most typically from a range from 19 μm to 230 μm. The at least one thin glass particularly typically has a mean thickness from a range from 21 μm to 210 μm. If the front surface and the back surface of the finished lens are both connected to at least one thin glass, the mean thickness of the at least one thin glass bonded on the object side may differ from, or be equal to, the mean thickness of the thin glass bonded on the eye side. Typically, the mean thickness of the at least one thin glass bonded on the object side is equal to the mean thickness of the thin glass bonded on the eye side.

The mean thickness of the at least one thin glass is understood to mean the arithmetic mean. Below a mean thickness of 10 μm, the at least one thin glass is mechanically too unstable to be able to be bonded to the finished optical surface of the semi-finished lens blank or to at least one of the finished optical surfaces of the finished lens or to be able to be coated without the at least one thin glass breaking. Above a mean thickness of 1000 μm, the at least one thin glass may lead to substrates that would have too great an edge thickness or too great a central thickness. The mean thickness of the at least one thin glass is typically measured with the Filmetrics F10-HC instrument (from Filmetrics Inc.). The mean thickness of the at least one thin glass is typically determined on the basis of the at least one thin glass in the form as used in practice, that is to say in the way in which the at least one thin glass is present prior to bonding to the finished optical surface of the semi-finished lens blank or prior to bonding to at least one of the finished optical surfaces of the finished lens. Alternatively, the mean thickness of the at least one thin glass can be determined by means of a scanning electron micrograph using a polished section. This can be implemented either on the basis of a polished section of the thin glass or on the basis of a polished section of the substrate comprising at least one thin glass bonded to the finished optical surface of a semi-finished lens blank or on the basis of a substrate comprising at least one thin glass bonded to at least one of the finished optical surfaces of the finished lens. For this purpose, the thickness of the at least one thin glass is determined in at least 3 locations and statistically averaged. Typically, the mean thickness of the at least one thin glass is determined by means of a scanning electron micrograph using a polished section of this substrate.

The relative standard deviation of the thickness distribution of the at least one thin glass is typically 0.1% to 100%, typically 0.2% to 81%, more typically 0.3% to 66% and most typically 0.4% to 24%. The relative standard deviation in [%] is the quotient of calculated standard deviation and mean thickness.

The at least one thin glass typically has a surface roughness Ra of <1 nm. Further typically, the surface roughness Ra of the at least one thin glass is within a range from 0.1 nm to 0.8 nm, more typically within a range of 0.3 nm to 0.7 nm and most typically in a range of 0.4 nm to 0.6 nm. The aforementioned values for the surface roughness Ra are each based on the front surface and the back surface of the at least one unformed, planar thin glass. After forming, the aforementioned values are in each case typically applicable only to that surface of the at least one thin glass that has not been brought into contact with the shaped body used for forming.

Depending on the shaped body used for forming, the aforementioned values may also be applicable to the surface of the at least one thin glass that was in contact with the shaped body used for forming. The surface roughness Ra of the at least one thin glass is typically determined by means of white-light interferometry, typically using the NewView 7100 instrument (from Zygo Corporation). If the at least one thin glass has further superficial unevenness, the area analysis of the respective surface can also be determined by phase-measuring deflectometry, typically with the SpecGage instrument (from 3D-Shape GmbH).

The at least one thin glass may be available with different surface topographies, for example planar, spherical, aspherical, aspherical rotationally symmetric, toric, atoric, progressive, as a symmetric free-form surface or as a non-symmetric free-form surface. In connection with the surface topography of the at least one thin glass, "planar" is understood to mean that the at least one thin glass does not have any macroscopically visible bending or curvature. If the at least one thin glass has a nonplanar surface, it is possible to achieve a desired surface topography, for example by deforming a planar thin glass on a corresponding negative mold. The surface topography of the at least one thin glass arranged on the eye side may be identical to, or different from, the shape of the at least one thin glass arranged on the object side.

The radius of curvature of the at least one thin glass is typically within a range from 10 mm to infinity, typically within a range from 20 mm to 1600 mm, further typically within a range from 35 mm to 1535 mm, further typically within a range from 56 mm to 600 mm, more typically within a range from 66 mm to 481 mm and most typically within a range from 75 mm to 376 mm. A radius of curvature of the at least one thin glass of infinity corresponds here to a planar surface. In the case of nonspherical surfaces of the at least one thin glass, the above-specified radii of curvature are each based on an approximate spherical form.

The at least one thin glass may be based on various glass compositions, for example borosilicate glass, aluminoborosilicate glass or alkali-free borosilicate glass. The at least one ultrathin glass is typically based on a borosilicate glass or an aluminoborosilicate glass. If both the front surface and the back surface of the finished lens are bonded to at least one thin glass, the at least one thin glass bonded to the front surface typically has the same glass composition as the at least one thin glass bonded to the back surface.

Thin glasses are commercially available, for example, under the D 263® T eco, D 263® LA eco, D 263® M, AF 32® eco, SCHOTT AS 87 eco, B 270® i names (each from Schott AG), or Corning Willow Glass or Corning Gorilla Glass, each from Corning Inc.

The substrate may comprise at least one layer which can change its surface topography as a result of being brought into contact with at least one medium, both on the front surface, that is to say the object-side surface which pursuant to DIN EN ISO 13666:2013-10, paragraph 5.8 is intended to be fitted away from the eye, and on the back surface, that is to say the eye-side surface which pursuant to DIN EN ISO 13666:2013-10, paragraph 5.9 is intended to be fitted nearer to the eye. Alternatively, the substrate may comprise at least one layer which can change its surface topography as a result of being brought into contact with at least one medium, only on the front surface or only on the back surface. The change of the surface topography of the at least one layer as a result of being brought into contact with at least one medium may be partly reversible or irreversible. Partly reversible in this case is understood to mean that a change in the surface topography obtained as a result of being brought into contact with at least one medium can be changed further after contact has been removed again, but it no longer returns to the surface topography of the at least one layer before contact was made. If the change in the surface topography is partly reversible, this partial change can be "frozen" and hence maintained, for example by way of coating at a desired time of the change. The change in the surface topography is typically irreversible. In this case, an irreversible change in the surface topography is understood to mean that a changed surface topography obtained once is no longer changed and hence is neither partly reversible nor reversible. An irreversibly changed surface topography is not changed by subsequent processing steps, for example the coating of at least one further layer on the at least one layer which has been changed in terms of its surface topography as a result of being brought into contact with at least one medium or the fitting of a spectacle lens comprising a substrate and at least one layer which has been changed in terms of its surface topography as a result of being brought into contact with at least one medium into a spectacle frame. In this case, the surface topography of the at least one layer itself is changed as a result of being brought into contact with at least one medium. Typically, the change is only brought about at those locations which actually are brought into contact with the at least one medium. The change in the surface topography of the at least one layer typically is a diffusion process, for which further typically Fick's first and second laws should be taken into account. Thus, there typically is no need for a further layer that needs to additionally be applied for the purposes of changing the surface topography. Typically, only the bringing into contact with the at least one medium is responsible for the change in the surface topography of the at least one layer. In contrast to the change in the at least one layer itself as described here, which is brought about merely by contact with the at least one medium, EP 3 531 195 A1, for example, requires the application of at least one further layer following the immobilization of a masking means, that is to say a layer of nanoparticles and/or microparticles in EP 3 531 195 A1, in order to obtain a nanostructured and/or microstructured layer from this at least one further layer following the removal of the masking means. This nanostructured and/or microstructured layer is formed in the interstices, in which the nanoparticles and/or microparticles do not contact or shadow the surface to be coated, following the removal of the nanoparticles and/or microparticles as a result of this further at least one layer.

At least one of the surfaces of the substrate may comprise the at least one layer, which can change its surface topography as a result of being brought into contact with at least one medium, over the whole area or at least in part. At least one of the surfaces of the substrate can consequently be covered or coated with this at least one layer over its whole area or at least one portion of at least one of the surfaces of the substrate can consequently be covered or coated with this at least one layer. If only at least one portion of at least one of the surfaces of the substrate is covered or coated with this at least one layer, this at least one portion may be adjacent at least to one further portion or may be a neighbor of at least one further portion on the same surface of the substrate. At least two portions on the same surface of the substrate are adjacent to one another if these at least two portions have at least one common point of contact. At least two portions on the same surface of the substrate are neighboring if these at least two portions have no common point of contact.

The at least one surface of the substrate which comprises the at least one layer able to change its surface topography as a result of being brought into contact with at least one medium may comprise, in addition to the aforementioned layer, at least one further layer, different from the aforementioned layer, on the same surface of the substrate and closer to the substrate in the layer sequence.

The at least one surface of the substrate which comprises the at least one layer able to change its surface topography as a result of being brought into contact with at least one medium may comprise, in addition to the aforementioned layer, at least one further layer, different from and/or identical to the aforementioned layer, on the same surface of the substrate and further away from the substrate in the layer sequence.

The surface of the at least one layer which can change its surface topography as a result of being brought into contact with at least one medium may have a spherical, aspherical, toric, atoric, planar or free-form surface-type design.

The change in the surface topography of the at least one layer as a result of being brought into contact with at least one medium typically is at least one elevation in the surface of this at least one layer which can change its surface topography as a result of being brought into contact with at least one medium, the elevation being in relation to the surface of this at least one layer before the latter has been brought into contact with the at least one medium. This at least one elevation typically is at least one positive change in the surface topography in relation to the surface topography before the surface of the at least one layer has been brought into contact with at least one medium. Independently of whether the front surface or the back surface of the substrate comprises at least one layer which can change its surface topography as a result of being brought into contact with at least one medium, the at least one positive change in the surface topography in relation to the surface topography before the contact with at least one medium typically is on the side facing away from the substrate.

The change of the surface topography of the at least one layer as a result of being brought into contact with at least one medium is typically a diffusion process. Fick's first and second law should typically be taken into account during this diffusion process.

The surface topography of the at least one layer can be changed locally or over the whole surface of the at least one layer as a result of being brought into contact with at least one medium. At least one of the surfaces of the substrate may comprise this at least one layer, which can change its surface topography as a result of being brought into contact with at least one medium, over the whole area or in part.

Both in the case of at least one local change of the surface topography and in the case of a change over the whole area of the surface topography, the typically positively changed surface of the at least one layer may comprise at least two contiguous and/or at least two noncontiguous maxima. At least two maxima are typically contiguous if there is at least one path from the one maximum to the other maximum of the at least two maxima along which there is no contact with the unchanged surface of the at least one layer. At least two maxima are typically noncontiguous if there is at least one path from the one maximum to the other maximum of the at least two maxima along which there is contact with the unchanged surface of the at least one layer.

In the case of at least one local change in the surface topography of the at least one layer, the maximum lateral extent thereof can typically range between 5 µm and 20 mm, more typically range between 10 µm and 10 mm, more typically range between 20 µm and 5 mm, particularly typically range between 50 µm and 4 mm, and very particularly typically range between 70 µm and 3 mm. The maximum lateral extent of a locally changed surface is the maximum distance between the two points of intersection of the changed surface with the unchanged surface of the at least one layer which have the greatest distance from one another. In the case of a nonplanar surface of the at least one layer, the distance between the two points of intersection of the changed surface with the unchanged surface of the at least one layer furthest apart is not identical to the surface of the at least one layer. The maximum lateral extent is typically determined by means of an optical profilometer based on white-light interferometry. The optical profilometer used is typically the NewView 7100 optical profilometer from Zygo Corporation.

In the case of at least one local change of the surface topography of the at least one layer or in the case of a change in the surface topography of the at least one layer over the whole area thereof, the change in the surface in relation to the unchanged at least one layer can typically range between 1 nm and 10 µm, more typically range between 2 nm and 9 µm, more typically range between 3 nm and 8 µm, particularly typically range between 4 nm and 7 µm, and very particularly typically range between 5 nm and 6 µm. If the changed surface comprises at least two contiguous and/or at least two noncontiguous maxima, the aforementioned ranges apply to each of these at least two maxima. The change in the surface topography typically is the height of the maximum in relation to the distance between the two points of intersection of the changed surface with the unchanged surface of the at least one layer which have the greatest distance from one another.

The change in the surface topography in relation to the unchanged surface of the at least one layer is likewise typically determined by means of an optical profilometer based on white-light interferometry.

The local change in the surface topography of the at least one layer may for example have an optical power ranging from 0.2 dpt to 50 dpt, typically ranging from 0.25 dpt to 40 dpt, more typically ranging from 0.3 dpt to 30 dpt, particularly typically ranging from 0.4 dpt to 20 dpt, and very particularly typically ranging from 0.5 dpt to 10 dpt. Every local change in the surface topography of the same surface of the at least one layer may have the same optical power or differ in terms of optical power in this case. If the local change in the surface topography comprises only one maximum, the optical power thereof is typically calculated according to the formulae below:

$$R = \frac{c^2}{8h} + \frac{h}{2}$$

where R=radius, c=chord, h=segment height, and $$\frac{1}{f} = (n-1)\left[\frac{1}{R1} - \frac{1}{R2} + \frac{(n-1)*d}{(n*R1*R2)}\right]$$

where f=focal length, n=refractive index of the at least one layer whose surface topography can be changed, R1=radius of the changed surface, R2=radius of the unchanged surface, d=distance between the changed surface and the unchanged surface.

If both the front surface and the back surface of the substrate each comprise at least one layer which can change its surface topography as a result of being brought into contact with at least one medium, the change in the surface topography of the front surface can be the same as, or different from, the change in the surface topography of the back surface. In this case, the change in the surface topography of the front surface is typically different from the change in the surface topography of the back surface.

If at least one of the surfaces of the substrate is, over the whole area thereof, covered or coated with at least one layer which can change its surface topography as a result of being brought into contact with at least one medium, the surface topography of this layer can be changed locally. This at least one local change in the surface topography of the at least one layer can be produced by virtue of the fact that the at least one region of the surface of the at least one layer whose surface topography is not intended to be changed is masked and only the at least one region of the surface which is intended to experience a change in the surface topography is brought into contact with the at least one medium. To mask the at least one region of the surface of the at least one layer whose surface topography is not intended to be changed, use can be made of any masking means which typically

- have a good adherence to this surface,
- can comprise regions or cutouts for the at least one region of the surface of the at least one layer which is intended to experience a change in the surface topography,
- do not lose their function as masking means as a result of being brought into contact with the at least one medium, for the period of contact, and
- can be removed without residue after having been brought into contact with the at least one medium.

The regions or cutouts of the masking means typically involve at least one region or at least one cutout.

By way of example, the masking means may comprise at least one pressure-sensitive adhesive, at least one adhesive means, at least one coating, at least one photoresist or at least one film. The regions or cutouts in the masking means for which the at least one region of the surface of the at least one layer is intended to experience a change in the surface topography can be produced in different ways, depending on the masking means. If at least one pressure-sensitive adhesive or at least one film is used as masking means, these regions or cutouts can be produced by means of a laser beam, for example. If at least one pressure-sensitive adhesive or film is used as masking means, these regions or cutouts are typically produced by means of a laser beam before the at least one film is applied to the surface of the at least one layer. By way of example, the film can be a metal film or a plastic film, which can optionally be reused. If at least one adhesive means is used as masking means, the at least one region of the surface of the at least one layer which is intended to experience no change in the surface topography as a result of being brought into contact with the at least one medium is typically covered by means of this at least one adhesive means by means of a printing method, particularly typically by means of an inkjet method. If at least one coating is used as masking means, these regions or cutouts can be produced by means of a lift-off method, for example. To this end, the negative of the masking means, that is to say the at least one region of the surface of the at least one layer which is intended to experience a change in surface topography, for example, is brought onto this at least one surface for example by means of a printing method, is covered by at least one further layer, for example a metal layer, and the regions printed on as a negative are removed prior to contact with the at least one medium. By way of example, the regions printed on as a negative may comprise or consist of at least one wax. Alternatively, the at least one region of the surface of the at least one layer whose surface topography is not intended to change as a result of being brought into contact with the at least one medium may be covered with at least one further layer, for example at least one primer coat layer and at least one hardcoat layer or at least one hardcoat layer, for example by means of a printing method, typically by means of an inkjet method. For the primer coat layer, use is typically made of a coating composition comprising i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion, ii) at least one solvent and iii) optionally at least one additive.

For the hardcoat layer, use is typically made of a layer, the production of which uses a composition according to EP 2 578 649 A1, in particular according to claim 1 of EP 2 578 649 A1. According to claim 1 of EP 2 578 649 A1, this composition comprises a silane derivative of the formula (I) $Si(OR1)(OR2)(OR3)(OR4)$, in which R1, R2, R3 and R4, which may be the same or different, are selected from alkyl, acyl, alkyleneacyl, cycloalkyl, aryl and alkylenearyl, which may optionally be substituted, and/or a hydrolysis and/or condensation product of the silane derivative of formula (I), a silane derivative of the formula (II) $R6R7_{3-n}Si(OR5)_n$, in which R5 is an unsubstituted or substituted alkyl, acyl, alkyleneacyl, cycloalkyl, aryl or alkylenearyl group, R6 is an organic radical containing an epoxide group, R7 is an unsubstituted or substituted alkyl, cycloalkyl, aryl or alkylenearyl group, n is 2 or 3, and/or a hydrolysis and/or condensation product of the silane derivative of formula (II), a colloidal inorganic oxide, fluoride or oxyfluoride, an epoxide compound having at least two epoxide groups, a catalyst system comprising a Lewis acid and a thermolatent Lewis acid-base adduct.

If at least one photoresist is used as masking means, these regions or cutouts can be produced by UV-light irradiation, for example.

If the at least one masking means comprises at least one pressure-sensitive adhesive, at least one photoresist or at least one film, the at least one masking means is typically removed following contact with the at least one medium. If the at least one masking means comprises at least one adhesive means, the at least one adhesive means is typically not removed following contact with the at least one medium. Instead, following the removal of the at least one medium, the at least one adhesive means serves typically for bonding to at least one further component, for example for bonding to at least one thin glass. In relation to their mean thickness, surface roughness, glass composition, radius of curvature and surface topography, thin glasses have already been described above in conjunction with usable substrates.

When brought into contact with the at least one medium, both the masking means and, by means of the regions or cutouts of the masking means, the at least one region of the surface of the at least one layer which is intended to experience at least one change in the surface topography can be brought into contact with the medium. Alternatively, by means of the regions or cutouts of the masking means, only the at least one region of the surface of the at least one layer which is intended to experience at least one change in the surface topography can be brought into contact with the at least one medium. If, by means of the regions or cutouts of the masking means, the at least one layer comprises at least two regions of the surface which are intended to experience at least one change in the surface topography, the one region of the surface can be brought into contact with the at least one same medium as the other region of the surface or with at least one medium which is different therefrom. In this case, the at least one medium can be identical in relation to the chemical composition but different in relation to its concentration or different in relation to the amount to be applied to the region of the surface to be changed. Regions or cutouts of the masking means with identical shape and identical size can cause a different change in the surface topography of the surface of the at least one layer by way of varying the at least one medium which is brought into contact with the surface of the at least one layer to be changed. If, by means of the regions or cutouts of the masking means, only the at least one region of the surface of the at least one layer which is intended to experience at least one change in the surface topography is to be brought into contact with the at least one medium, this contacting is typically implemented by means of a printing method, particularly typically by means of an inkjet method.

When brought into contact with the at least one medium, both the masking means and, by means of the regions or cutouts of the masking means, those regions of the surface of the at least one layer which are intended to experience at least one change in the surface topography are typically brought into contact with the medium.

If the at least one masking means comprises at least one coating, this coating or layer of the at least one layer which can be changed in terms of its surface topography as a result of being brought into contact with the at least one medium can be the same or different. If the masking means comprises at least one coating which is identical to the at least one layer which can change its surface topography as a result of being brought into contact with at least one medium, both the at least one layer and the masking means itself may experience a change in the surface topography. In this case, an identical coating is understood to be a coating which is identical in relation to the property of being able to be changed in terms of its surface topography as a result of being brought into contact with at least one medium. Consequently, the at least one masking means may comprise at least one coating that is identical to the at least one layer which can change its surface topography, the coating for example differing therefrom in terms of its chemical composition but likewise having the property of being able to change the surface topography as a result of being brought into contact with at least one medium. By way of example, the at least one layer which can change its surface topography as a result of being brought into contact with at least one medium can be at least one photochromic layer without a colorant and the coating of the masking means can be at least one photochromic layer with a colorant, which likewise can change its surface topography as a result of being brought into contact with at least one medium. Additionally, the at least one layer which can change its surface topography as a result of being brought into contact with at least one medium can be at least one photochromic layer with at least one colorant and the coating of the masking means can be at least one photochromic layer with at least one colorant which is different therefrom, which likewise can change its surface topography as a result of being brought into contact with at least one medium. In this case, the at least one medium can in each case be identical to or different from one another. Should the masking means comprising at least one coating and the at least one identical layer whose surface topography is intended to be changed be brought into contact with at least one different medium, this is typically implemented by means of a printing method, typically by means of an inkjet method.

If the at least one masking means comprises at least one coating, the latter may or may not be removed after being brought into contact with the at least one medium. If the at least one masking means comprises at least one coating which, according to the definition above, is identical to the at least one layer whose surface topography is intended to be changed, the at least one masking means is typically not removed after being brought into contact with the at least one medium. If the at least one masking means comprises at least one coating which, according to the definition above, is not identical to the at least one layer whose surface topography is intended to be changed, that is to say which does not experience a change in the surface topography as a result of being brought into contact with at least one medium, this at least one masking means may or may not be removed after being brought into contact with at least one medium. By way of example, if the at least one masking means comprises at least one hardcoat layer, for the production of which a composition according to EP 2 578 649 A1, in particular claim 1 of EP 2 578 649 A1, is particularly typically used, this coating may remain on the at least one layer or be removed from this at least one layer again following the change in the surface topography of the at least one layer and removal of the at least one medium. If the at least one masking means comprises at least one above-described primer coat layer and at least one above-described hardcoat layer, these two layers, following the change in the surface topography of the at least one layer and the removal of the at least one medium, can remain on the at least one layer. This is particularly advantageous if the at least one layer is in any case intended to be coated on the side facing away from the substrate with at least one coating, typically at least one hardcoat layer or at least one primer coat layer and at least one hardcoat layer. The further possible coating of the at least one layer following the change in its surface topography and following the removal of the at least one medium will still be described in detail below. However, in advance, it should be noted that provided the at least one further coating with the layer thickness C is applied both to the at least one masking means with the layer thickness M and the changed surface of the at least one layer with a maximum distance L from the unchanged surface, no optical power of the changed surface can be observed for $C>2(M-L)$, independently of the refractive index of the at least one layer whose surface topography has been changed and independently of the refractive index of the at least one further coating. Provided the further coating with the layer thickness C is applied both to the at least one masking means with the layer thickness M and the changed surface of the at least one layer with a maximum distance L from the unchanged surface, an optical power of the changed surface can be observed for $C<2(M-L)$, depending on the refractive index of the at least one layer whose surface topography has been changed and depending on the refractive index of the at least one further coating.

The regions or cutouts of the masking means in which the at least one layer is intended to change its surface topography as a result of being brought into contact with the at least one medium may be situated at any desired location of the masking means. The regions or cutouts of the masking means may moreover have any desired shape. By way of example, these regions or cutouts of the masking means may be circular, oval, linear, triangular, quadrilateral, pentagonal or hexagonal. The aforementioned regions or cutouts may furthermore be present as a respective cutout over their whole area or the respective cutout may in turn have a region without a cutout. Typically, the regions or cutouts of the masking means are at least one circle or at least one line. The regions or cutouts of the masking means may moreover comprise any desired area. By way of example, the regions or cutouts may comprise an area ranging from 0.03 mm$^2$ to 60.8 mm$^2$, typically ranging from 0.1 mm$^2$ to 50.2 mm$^2$, more typically ranging from 0.3 mm$^2$ to 28.3 mm$^2$, particularly typically ranging from 0.5 mm$^2$ to 12.6 mm$^2$, and very particularly typically ranging from 0.7 mm$^2$ to 2.5 mm$^2$.

The regions or cutouts of a masking means may have an identical shape and/or an identical area. Alternatively, at least two of these regions or cutouts of a masking means may differ in terms of shape. Moreover, at least two of these regions or cutouts of a masking means may have an identical shape but differ in terms of area. Also, at least two of these regions or cutouts of a masking means may have an identical area but differ in terms of shape. Further alternatively, at least two regions or cutouts of a masking means may differ in terms of shape and differ in terms of area.

In addition to the aforementioned variation options, which may influence the change in the surface topography of the at least one layer, the layer thickness of the at least one layer whose surface can be changed in terms of its surface topography as a result of being brought into contact with at least one medium should also be mentioned. When the substrate is covered over its whole area by the at least one layer, the latter may have the same layer thickness over the whole area or may have different layer thicknesses. Should the layer thickness of the at least one layer vary in a defined manner over the whole surface of the substrate, the at least one layer is typically applied by means of a printing method, particularly typically by means of an inkjet method. A different layer thickness of the at least one layer at at least two different locations offers a different starting point for the change in the surface topography of the at least one layer. The chemical composition of the at least one layer itself is a further parameter which may influence the change in the surface topography of the at least one layer. The chemical composition of the at least one layer, which is present over the whole area on at least one surface of the substrate, may be identical or differ over the complete surface. If the at least one layer does not have an identical chemical composition at each location, this is typically realized by means of a printing method, particularly typically by means of an inkjet method.

If at least one of the surfaces of the substrate is completely coated or covered with at least one layer which can change its surface topography as a result of being brought into contact with at least one medium, at least one local change in the surface topography of this at least one layer can be produced, as an alternative or in addition to the above-described masking, by virtue of the at least one layer being brought into contact with the at least one medium only at the at least one location or in the at least one region where there is intended to be the at least one local change in the surface topography. This targeted contacting of the at least one layer by the at least one medium is typically implemented by applying the at least one medium onto the surface of the at least one layer. Typically, the at least one medium is applied by means of a printing method, particularly typically by means of an inkjet method. The change in the surface topography can vary depending on, for example, the concentration of the at least one medium and/or the number of volume elements which are applied one above another to the same location or to the same region of the surface of the at least one layer by means of an inkjet method. Consequently, it is possible to change the surface topography of the at least one layer in a targeted manner by selecting the location or the region of the surface. Additionally, the concentration of the at least one medium and/or the number of volume elements of the at least one medium applied above one another typically by means of an inkjet method can influence the change in the surface topography in a targeted manner. The local change in the surface topography of the surface of the at least one layer can furthermore be influenced by the selection of the at least one medium which may be identical or different. The at least one medium is typically identical in terms of chemical composition but may have a different concentration.

If at least one of the surfaces of the substrate is, over the whole area thereof, covered or coated with at least one layer which can change its surface topography as a result of being brought into contact with at least one medium, the surface topography of this at least one layer can be changed over its whole area. If both the front surface and the back surface of the substrate each comprise at least one layer over their whole area, which at least one layer can change its respective surface topography as a result of being brought into contact with at least one medium, this change in the surface topography of the at least one eye-side layer can be the same as, or different from, the change in the surface topography of the at least one object-side layer. If both the front surface and the back surface of the substrate each comprise at least one layer over their whole area, which at least one layer can change its respective surface topography as a result of being brought into contact with at least one medium, the respective changes in the surface topography typically differ. In this case, the surface topography of the at least one layer present over the whole area of at least one of the surfaces may experience a change in the surface topography over the whole area which is different to the change of the surface topography over the whole area of the at least one layer present over the whole area of the respectively opposite surface. Alternatively, the surface topography of the at least one layer present over the whole area of at least one of the surfaces may experience a change in the surface topography over the whole area and the at least one layer present over the whole area of the opposite surface may experience no change or at least one local change in the surface topography. Reference is made to the explanations above in relation to the at least one local change in the surface topography of the at least one layer. If both the front surface and the back surface of the substrate in each case comprises at least one layer over their whole area, which at least one layer can change its respective surface topography as a result of being brought into contact with at least one medium, the at least one layer present on one of the surfaces can experience at least one change in the surface topography and the at least one layer present on the respectively opposite surface may experience no change in the surface topography.

If at least one of the surfaces of the substrate comprises at least one layer over its whole area, which at least one layer can change its surface topography as a result of being brought into contact with at least one medium, this change in the surface topography of the at least one layer can initially be brought about over the whole area and subsequently this surface that has been changed over the whole area can further experience at least one local change in the surface topography. Alternatively, the at least one layer present over the whole area may also conversely initially experience at least one local change in the surface topography and subsequently experience a change in the surface topography over the whole area. Both the change in the surface topography over the whole area and also at least one local change in the surface topography can be implemented at least once in all aforementioned exemplay embodiments. If both surfaces of the substrate each comprise at least one layer over their whole area, which at least one layer can change its respective surface topography as a result of being brought into contact with at least one medium, the change in the surface topography of the same at least one layer can be implemented at least once locally and at least once over the whole area, and the at least one opposite layer can experience no change in the surface topography, an identical change in the surface topography or a different change in the surface topography. In the latter case, no change or a different change in the surface topography is typical.

The change in the surface topography of the at least one layer over the whole area thereof can be achieved by means of at least one masking means which facilitates a change in the surface topography of the at least one layer over its whole area as a result of being brought into contact with at least one medium by having a sufficient number of regions or cutouts and/or by way of a suitable spatial arrangement of regions or cutouts. The assumption is made that this change in the at least one surface topography of the at least one layer over the whole area thereof, which at least one layer can change its surface topography as a result of being brought into contact with at least one medium, is also possible using at least one masking means since this change is a diffusion process in which Fick's first and second laws should be taken into account. Under the assumption of a diffusion process, even the regions of the surface of the at least one layer which are covered by the at least one masking means consequently change their surface topography at least in part. For the purposes of changing the surface topography of the at least one layer over the whole area thereof, which at least one layer can change its surface topography as a result of being brought into contact with at least one medium, the at least one masking means is typically designed such that a predefined surface topography can be realized when the diffusion process is taken into account.

A change in the surface topography of the at least one layer over the whole area thereof in this case also comprises at least two adjoining positively changed portions of the surface comprising at least one common point of intersection with the surface of the at least one layer before the change thereof as a result of being brought into contact with at least one medium. The regions or cutouts of the at least one masking means may, as already described above, comprise any desired shape and/or any desired area. The regions or cutouts of the at least one masking means are typically created depending on the surface topography of the at least one layer to be obtained, which at least one layer is intended to be changed in terms of its surface topography as a result of being brought into contact with at least one medium. Within the scope of contacting at least one medium, the regions or cutouts of the at least one masking means can be used to bring both at least the regions of the at least one layer which are intended to change its surface topography as a result of being brought into contact with at least one medium and the masking means itself into contact with the at least one medium. Alternatively, the regions or cutouts of the at least one masking means can be used to bring only the regions of the at least one layer which are intended to change its surface topography as a result of being brought into contact with at least one medium into contact with the at least one medium. In the latter case, at least two regions or cutouts of the at least one masking means can be used to bring these at least two regions of the at least one layer which are intended to change its surface topography into contact with at least one identical medium or with different media. In this case, the at least one identical medium can be identical in relation to the chemical composition but for example be brought into contact with these at least two regions, for example in different concentrations and/or in different amounts. By way of example, contacting different media or contacting a medium identical in terms of chemical composition but differing in terms of concentration and/or amount can cause at least two regions of the at least one layer which are identical in terms of shape and area to experience a different change in the surface topography. The targeted contacting of the regions of the surface of the at least one layer which is intended to experience a change in the surface topography as a result is typically implemented by means of a printing method, particularly typically by means of an inkjet method, by means of which the respectively desired medium is applied to the respectively desired position. If at least one of the surfaces is covered by at least one layer over its whole area, which at least one layer can change its surface topography as a result of being brought into contact with at least one medium, this change by means of at least one masking means, which comprises regions or cutouts in at least one suitable shape and with at least one suitable area, may also be brought about by at least one variation in the at least one medium. Consequently, a plurality of surface topographies are rendered accessible from the numerous variation options arising herefrom. In addition to the aforementioned variation options, it should also be mentioned that the at least one layer which can change its surface topography as a result of being brought into contact with at least one medium may be present on the same surface of the substrate, over the whole area thereof and with a different layer thickness. The different layer thickness therefore offers a different starting point for the positive change of the surface topography of the at least one layer. A different layer thickness of the at least one layer is typically realized by means of a printing method, particularly typically by means of an inkjet method.

The at least one masking means may comprise at least one of the above-described masking means. Typically the at least one masking means comprises at least one coating which can be identical to or different from the at least one layer which can be changed in terms of its surface topography as a result of being brought into contact with the at least one medium. Reference is made to the explanations above in relation to the at least one coating identical to or different from the at least one layer.

As an alternative or in addition to the above-described whole-area change in the surface topography of the at least one layer present over the whole area on at least one of the surfaces of the substrate, the change being brought about by means of at least one masking means, a change in the surface topography of the at least one layer over the whole area thereof can be brought about by contacting at least one medium, over the whole area thereof or at least in part. In this case, a whole-area change in the surface topography also comprises at least two regions of the at least one layer being able to comprise at least one common point of intersection with the unchanged surface of the at least one layer following the respective positive change in the surface topography of the at least two regions. The at least one layer which can change its surface topography as a result of being brought into contact with at least one medium may in this case over its entire surface be brought into contact with a single medium which for example is identical in relation to the chemical composition. In this case, this single medium may be present with identical concentration and in an identical amount at every location on the surface such that in the case of an identical layer thickness of the at least one layer an identical change in its surface topography can typically be observed. Alternatively, the surface of the at least one layer might not be brought into contact with a single medium with identical concentration and in identical amount at every location. Nevertheless, a whole-area change in the surface topography of the at least one layer is achievable even in the latter case if the distances between the selected locations that are brought into contact with this single medium take account of the diffusion processes according to Fick's first and second law. Further variation options for designing the surface topography of the at least one layer are offered by a different layer thickness of the same at least one layer and/or a different chemical composition of the same at least one layer. A different layer thickness and/or a different layer thickness of the same at least one layer is typically realized by means of a printing method, particularly typically by means of an inkjet method.

The surface of the at least one layer which can change its surface topography as a result of being brought into contact with at least one medium can furthermore be changed over its whole area by virtue of, depending on the surface topography to be obtained, a single medium, typically identical in terms of the chemical composition, being brought into contact with this surface in a targeted manner with a different concentration and/or in a different amount. In this case, this targeted contacting can be implemented over the whole area or in part. In the case of partial targeted contacting, the diffusion processes according to Fick's first and second law are typically taken into account such that a whole-area change in the surface topography is ensured. The layer thickness of the at least one layer which can change its surface topography as a result of being brought into contact with at least one medium can be the same at each location or can vary. If the layer thickness of this at least one layer varies, the starting point for the positive change of the surface topography is different at each location of this layer.

The surface of the at least one layer which can change its surface topography as a result of being brought into contact with at least one medium can furthermore be changed over its whole area by virtue of, depending on the surface topography to be obtained, at least two media that differ in terms of their chemical composition being brought into contact with this surface in a targeted manner. Furthermore, these at least two media that differ in terms of their chemical composition can be brought into contact with the surface to be respectively changed in a targeted manner, in each case with different concentration and/or in a different amount. When using at least two media that differ in terms of their chemical composition, it is also possible for these to be brought into contact with the surface to be respectively changed, in targeted fashion over the whole area or in targeted fashion over a portion. In the case of partial targeted contacting, the diffusion processes according to Fick's first and second law are typically taken into account even if at least two media that differ in terms of the chemical composition are used such that a whole-area change of the surface topography is ensured. Additionally, it should be noted that the layer thickness of the at least one layer can be the same or different at all locations over the complete surface. A different layer thickness of the at least one layer can consequently offer a different starting point and can represent a further parameter to be taken into account for the purposes of a targeted positive change in the surface topography.

Targeted contacting of the at least one medium with the at least one layer present over the whole area may also comprise at least two media differing in terms of their chemical composition being successively brought into contact with the surface of the at least one layer at identical and/or different positions. Alternatively, a medium identical in terms of the chemical composition can be successively brought into contact with the surface of the at least one layer at identical and/or different positions. The respective concentration and/or the respective amount of the medium may vary, both in the case of the successive contacting of at least two media differing in terms of the chemical composition just described and in the case of the successive contacting of a single medium.

It is clear from the numerous variation possibilities that surface topographies which are not accessible to conventional mechanical processing of a lens blank or a semi-finished lens blank are rendered possible. Moreover, it is possible to produce an independent, typically independent, continuous or gradual change in the surface topography of the at least one layer by way of a concentration gradient in the at least one medium. An independent, typically independent, continuous or gradual change in the surface topography of the at least one layer can also be generated by way of a gradient in the number of volume elements applied above one another, typically by means of an inkjet method, to the surface of the at least one layer. A combination of the two aforementioned gradients is also possible.

A whole-area change in the surface topography of the at least one layer can alternatively also be obtained by virtue of this at least one layer being applied in part, but with suitable lateral spacing, on at least one of the surfaces of the substrate so that a whole-area change of the surface topography of this layer is implemented as a result of being brought into contact with at least one medium. In this case, a whole-area change in the surface topography comprises at least two regions being able to comprise one common point of intersection with the surface of the substrate following the respective positive change in the surface topography of the at least two regions. The at least one layer can be present in part and with the same or different layer thicknesses on at least one of the surfaces of the substrate. Furthermore, the at least one layer which is able to change its surface topography as a result of being brought into contact with at least one medium may have an identical or different chemical composition at each applied location. The partial application of the at least one layer is typically implemented by means of a printing method, particularly typically by means of an inkjet method. Reference is made to the explanations above in relation to the numerous variation options in relation to the at least one medium.

If at least one of the surfaces of the substrate comprises at least one layer at least in part, which at least one layer can change its surface topography after being brought into contact with at least one medium, this change in the surface topography may be implemented over the whole area and/or locally. One of the surfaces comprises the at least one layer in part if it is not present over the whole area. The at least one layer is typically applied to at least one of the surfaces of the substrate by means of a printing method, particularly typically by means of an inkjet method. The whole-area or local change in the surface topography of this at least one partially applied layer can be implemented as described above.

The at least one surface of the at least one layer is typically brought into contact with at least one medium over a time period ranging from 20 minutes to 40 hours, further typically ranging from 25 minutes to 30 hours, more typically ranging from 30 minutes to 20 hours, particularly typically ranging from 35 minutes to 15 hours and very particularly typically ranging from 40 minutes to 10 hours. Contacting may be implemented at room temperature, that is to say at a temperature of 22° C.±2° C., or at an elevated temperature. In this case, an elevated temperature typically comprises a temperature ranging from 25° C. to 80° C., more typically ranging from 25° C. to 60° C., more typically ranging from 27° C. to 55° C., particularly typically ranging from 30° C. to 50° C. and very particularly typically ranging from 35° C. to 45° C. Furthermore, contacting can be implemented under xenon irradiation at a wavelength ranging from 280 nm to 1200 nm. Optionally, the at least one layer whose surface topography is intended to be changed can be rinsed with deionized water during the contacting under xenon irradiation. The aforementioned conditions for bringing the surfaces of the at least one layer into contact with at least one medium can be combined in any desired way. Should the at least one surface of the at least one layer have been provided with a masking means for the targeted contacting with the at least one medium, as described above, this masking means can be removed before the spectacle lens comprising the at least one layer and the at least one medium is exposed to an elevated temperature and/or xenon irradiation.

As already explained above, the change in the surface topography of the at least one layer which can change its surface topography as a result of being brought into contact with at least one medium typically is a diffusion process in which Fick's first and second law are typically to be taken into account, and so the change in the surface topography is therefore not restricted to the regions or the location of the surface of the at least one layer which are/is brought into contact with the at least one medium.

If reference is made above to targeted contacting of the surface of the at least one layer with the at least one medium, this is understood to mean that the surface of the at least one layer is brought into contact with the at least one medium only at a location defined in advance or in a region defined in advance. The location defined in advance or the region defined in advance is typically determined by the desired positive change in the surface of the at least one layer to be obtained.

The local change in the surface topography of the at least one layer which can change its surface topography as a result of being brought into contact with at least one medium can typically also be understood as a short wavelength surface segment adjacent to a long wavelength surface. The short wavelength surface segments are typically surface segments with a periodicity shorter than the smallest periodicity of the adjacent long wavelength surface of the at least one layer. This typically applies to whole-area and partial coverage of at least one of the surfaces of the substrate by the at least one layer.

From the aforementioned numerous variation options, for example in relation to the at least one masking means, the at least one medium, the layer thickness of the at least one layer, the surface topography of which can be changed as a result of being brought into contact with at least one medium, the chemical composition of the at least one layer, the time period of contacting, the temperature of contacting and/or the possible irradiation during contacting, it is clear that a plurality of conceivable surface topographies are rendered accessible by way of at least contacting the at least one layer, the surface topography of which is intended to be changed, with at least one medium. In particular, this also renders surface topographies accessible which are not accessible by conventional mechanical processing methods, for example milling and/or grinding and/or turning and/or polishing. These surface topographies should typically be manufactured on an individual basis for the eye of a spectacles wearer.

The substrate and hence the at least one layer whose surface topography is intended to be changed may have any desired surface topography, for example a spherical, aspherical, toric, atoric or free-form topography. By bringing the surface topography of the at least one layer whose surface topography is intended to be changed into contact with at least one medium, it is consequently possible to convert a simple surface topography, e.g., a spherical surface topography, of the at least one layer into a free-form surface topography. Consequently, the surface topography of the substrate does not correspond to the surface topography of the at least one layer following contacting with at least one medium.

In a further exemplay embodiment, at least one thin glass described above in conjunction with a substrate to be used may comprise at least one layer which can change its surface topography as a result of being brought into contact with at least one medium. This at least one thin glass may for example be bonded to at least one of the surfaces of one of the above-described substrates by means of an adhesive means or may be connected to a finished lens by means of a detachable connection ("clip connection or clip-on connection"). This detachable connection may be of interest, for example, if the changed surface topography should be presented for demonstration purposes or if the changed surface topography should be worn alternately with the finished lens.

Typically, the surface of the substrate which has the simpler surface geometry comprises the at least one layer whose surface can be changed in terms of its surface topography as a result of being brought into contact with at least one medium. By way of example, if one of the surfaces of the substrate has a spherical or planar surface geometry and the opposite surface has a free-form surface geometry, the surface with the spherical or planar surface geometry would in this case typically comprise the at least one layer whose surface topography can be changed as a result of being brought into contact with at least one medium.

The at least one layer which can change its surface topography after being brought into contact with at least one medium is typically completely on the surface to be coated prior to being brought into contact with the at least one medium; thus, typically no further application of this at least one layer is provided. Moreover, the at least one layer which can change its surface topography as a result of being brought into contact with the at least one medium is typically cured and not only surface dried.

The at least one layer which can change its surface topography after being brought into contact with at least one medium typically comprises a photochromic layer according to EP 1 602 479 A1, in particular according to claim 9 of EP 1 602 479 A1, or a layer according to EP 1 433 814 A1, in particular according to claim 1 of EP 1 433 814 A1, or a layer according to EP 1 561 571 A1, in particular according to claim 10 of EP 1 561 571 A1, or a photochromic layer according to page 10, line 23—page 21, line 18 of WO 03/058300 A1.

EP 1 602 479 A1 discloses a photochromic layer which should be applied above a primer layer based on a polyurethane resin. The photochromic layer is based on a curable composition which comprises 20% by weight to 90% by weight of a radically polymerizable monomer, 0.5% by weight to 20% by weight of a radically polymerizable monomer comprising a silanol group or a group which forms a silanol group by hydrolysis, 0.01% by weight to 15% by weight of an amine compound and 0.1% by weight to 30% by weight of a photochromic compound, with the % by weight specifications being in each case related to the overall weight of the composition. If the photochromic layer is applied to the primer layer disclosed in EP 1 602 479 A1, the photochromic layer need not necessarily comprise the amine compound. The radically polymerizable monomer typically is a mixture of a radically polymerizable monomer ("high hardness monomer") having an L scale Rockwell hardness of 60 or more in the homopolymerized cured product and a radically polymerizable monomer ("low hardness monomer") having an L scale Rockwell hardness of less than 40 in the homopolymerized cured product. Claim 9 of EP 1 602 479 A1 claims a curable composition comprising 100 parts by weight of a radically polymerizable monomer, 0.001 to 5 parts by weight of a silicone base or fluorine base surfactant and 0.01 to 20 parts by weight of a photochromic compound.

EP 1 433 814 A1 discloses a curable composition which comprises a combination of a radically polymerizable monomer having an L scale Rockwell hardness of 60 or more ("high-hardness monomer") and a radically polymerizable monomer having an L scale Rockwell hardness of less than 40 ("low-hardness monomer") and a photochromic compound. Moreover, the curable composition may also comprise radically polymerizable monomers having an L scale Rockwell hardness of 40 or more and less than 60 ("intermediate-hardness monomer"). The corresponding monomers are specified in more detail in paragraphs [0049] to [0097] of EP 1 433 814 A1. To improve the balance of the characteristic properties such as solvent resistance, hardness, heat resistance, color development intensity and fading speed of the coating obtained from this curable composition, the amount of the radically polymerizable monomers having an L scale Rockwell hardness of less than 40 is typically 5 to 70% by weight and the amount of the radically polymerizable monomers having an L scale Rockwell hardness of 60 or more is typically 5 to 95% by weight, based in each case on the total weight of all radically polymerizable monomers excluding the radically polymerizable monomers specified below, which comprise a silanol group or form a silanol group by hydrolysis, or comprise an isocyanate group. To improve the adherence between the coating obtained from this curable composition and a spectacle lens substrate or a hardcoat, for improving the abrasion resistance and for improving the photochromic properties, the curable composition furthermore comprises, in addition to the aforementioned combination of radically polymerizable monomers, a radically polymerizable monomer which comprises a silanol group or forms a silanol group by hydrolysis, or a radically polymerizable monomer which comprises an isocyanate group. According to EP 1 433 814 A1, the amount of the radically polymerizable monomer which comprises a silanol group or forms a silanol group by hydrolysis, or a radically polymerizable monomer which comprises an isocyanate group, is typically between 0.5% by weight and 20% by weight, in relation to the overall weight of all radically polymerizable monomers. The curable composition may further comprise an amine in an amount of 0.01 to 20 parts by weight, in relation to the overall weight of the radically polymerizable monomers.

Claim 1 of EP 1 433 814 A1 claims a curable composition comprising 100 parts by weight of a radically polymerizable monomer, 0.01 to 20 parts by weight of an amine compound and 0.1 to 20 parts by weight of a photochromic compound. The radically polymerizable monomer here includes a radically polymerizable monomer comprising a silanol group or comprising a group which forms a silanol group by hydrolysis, and/or a radically polymerizable monomer comprising an isocyanate group.

Claim 10 of EP 1 561 571 A1 claims a photopolymerizable and curable composition comprising (A) a radically polymerizable monomer, (B) a photochromic compound and (C) a photopolymerization initiator component, wherein the photochromic compound (B) is contained in an amount of 0.2 to 20% by weight, and the photopolymerization initiator component (C) contained therein comprises a phosphorus-containing polymerization initiator in an amount of 0.01 to 10 parts by weight and photopolymerization initiators other than the phosphorus-containing polymerization initiator in an amount of 0.01 to 10 parts by weight per 100 parts by weight of the radically polymerizable monomer (A). According to EP 1 561 571 A1, a high molecular film with a thickness of 1 to 100 μm is formed on a substrate. The radically polymerizable monomers (A) which may comprise radically polymerizable groups such as a (meth)acryloyl group, a (meth)acryloyloxy group, a vinyl group, an allyl group or a styrene group, are described in more detail in paragraphs [0035] to [0111] of EP 1 561 571 A1. According to EP 1 561 571 A1, the radically polymerizable polymer typically comprises 5 to 95% by weight of a hard monomer ("highly hard monomer"), the homopolymer of which has an L scale Rockwell hardness of 60 or more, and 5 to 70% by weight of a hard monomer ("lowly hard monomer"), the homopolymer of which has an L scale Rockwell hardness of 40 or less.

Particularly typically, the at least one layer which can change its surface topography after having been brought into contact with at least one medium comprises a photochromic layer according to EP 1 602 479 A1, in particular according to claim 9 of EP 1 602 479 A1, or a layer according to EP 1 433 814 A1, in particular according to claim 1 of EP 1 433 814 A1.

The at least one layer which can change its surface topography as a result of being brought into contact with at least one medium furthermore particularly typically comprises a composition according to the above-described photochromic layers, which does not comprise a colorant in each case.

At least one primer layer may be present between the substrate and the at least one layer which can change its surface topography as a result of being brought into contact with at least one medium, typically directly adjacent to the at least one reactive layer on the substrate-facing side. The at least one primer layer used may be the polyurethane resin layer disclosed in EP 1 602 479 A1, especially in EP 1 602 479 A1, claim 1, or the primer layer disclosed in WO 03/058300 A1, especially in WO 03/058300 A1, page 22 line 3 to page 23 line 13. The at least one primer layer used is typically the polyurethane resin layer disclosed in EP 1 602 479 A1, especially in EP 1 602 479 A1, claim 1. EP 1 602 479 A1, claim 1, claims a product comprising a polyurethane resin layer on at least one surface of the substrate in the layer sequence. This polyurethane resin layer comprises a cured product of a moisture-curing polyurethane resin and/or a precursor thereof.

In the case of both whole-area and partial coverage of at least one of the surfaces of the substrate, the at least one layer which can change its surface topography as a result of contacting may be identical or different over the full whole-area or the full partial coverage. In the case of identical coverage, at least one of the surfaces of the substrate is covered, over its whole area or in part, with at least one layer which is identical in relation to the chemical composition. Both the front surface and the back surface of the substrate may each comprise, over the whole area or in part, at least one layer which is identical in relation to the chemical composition. If both the front surface and the back surface of the substrate each comprise, in part, at least one layer that is identical in relation to the chemical composition, the respective at least one location and/or the respective at least one region where the at least one layer is at least partly present may be the same on the front surface and the back surface or may differ between these. Typically, the respective at least one location and/or the respective at least one region where the at least one layer is at least partly present differ between the front surface and the back surface. The at least one layer which can change its surface topography as a result of being brought into contact with at least one medium may also differ in relation to the chemical composition over the complete whole-area or the complete partial coverage of at least one of the surfaces of the substrate. In this case, "differ" typically means that the chemical composition of the at least one layer is not identical but different at different locations and/or in different regions on the same surface of the substrate. This applies to both partial and whole-area coverage of the same surface of the substrate. If both the front surface and the back surface of the substrate comprise at least one different layer in relation to the chemical composition, this different layer on the front surface main turn be identical to or different from the at least one different layer on the back surface. In the case of both whole-area and partial coverage of one of the surfaces, the different layer in turn is different from the respectively opposite surface.

A differing layer in relation to the chemical composition and also partial coverage of at least one of the surfaces with the at least one layer which in this case may be identical or different from one another is typically implemented by means of a printing method, particularly typically by means of an inkjet method.

The at least one layer which can change its surface topography as a result of being brought into contact with at least one medium typically has a mean thickness ranging from 0.5 μm to 200 μm, more typically ranging from 1 μm to 166 μm, more typically ranging from 1.5 μm to 121 μm, particularly typically ranging from 1.8 μm to 87 μm, and most particularly ranging from 2.0 μm to 60 μm.

The layer thickness of the at least one layer which can change its surface topography as a result of being brought into contact with at least one medium may be the same or different over the complete whole-area or the complete partial coverage of the substrate of at least one of the surfaces of the substrate. Partial coverage of at least one of the surfaces of the substrate is typically realized by means of a printing method, particularly typically by means of an inkjet method. Coverage of the same at least one surface of the substrate with at least one layer with different layer thicknesses, over the whole area or in part, is likewise typically realized by means of a printing method, particularly typically by means of an inkjet method. If both the front surface and the back surface of the substrate comprises at least one layer whose surface topography can be changed as a result of being brought into contact with at least one medium, the layer thickness of the at least one layer of one of the surfaces can be the same as or different from the layer thickness of the at least one layer on the respectively opposite layer. This applies to whole-area coverage of both surfaces and to partial coverage of both surfaces, and also to whole-area coverage of one surface and partial coverage of the respectively opposite surface, in each case with the at least one layer.

The at least one medium by means of which the surface topography of the at least one layer can be changed as a result of contacting typically comprises at least one organic acid, particularly typically a liquid organic aliphatic saturated or unsaturated, optionally substituted, monocarboxylic acid. The at least one medium particularly typically comprises at least one liquid organic aliphatic saturated or unsaturated monocarboxylic acid having 2 to 22 carbon atoms, typically having 3 to 18 carbon atoms. By way of example, the at least one medium may comprise at least one organic acid from the group consisting of acetic acid, propionic acid, acrylic acid, lactic acid, butyric acid, isobutyric acid, valeric acid, enanthic acid, caproic acid, caprylic acid, pelargonic acid, myristoleic acid, palmitoleic acid, linoleic acid, alpha-linolenic acid, gamma-linolenic acid, oleic acid, ricinoleic acid, stearidonic acid, stearic acid, arachidonic acid, eicosapentaenoic acid, docosapentaenoic acid and docosahexaenoic acid. The at least one medium typically comprises at least one organic acid from the group consisting of acetic acid, lactic acid, butyric acid, caproic acid, caprylic acid, pelargonic acid, linoleic acid, alpha-linolenic acid, gamma-linolenic acid and oleic acid. Particularly typically, the at least one medium comprises at least one organic acid selected from the group consisting of lactic acid, caprylic acid and oleic acid. Alternatively, the at least one medium may comprise at least one tricarboxylic acid, for example citric acid, or an inorganic acid, for example hydrochloric acid. The aforementioned media can be used on their own or in combination. If the aforementioned media are intended to be applied by means of a printing method, in particular by means of an inkjet method, these may be modified for the purposes of setting a suitable viscosity. The aforementioned media can be used in commercially obtainable quality, e.g., technical quality, or in diluted form.

After bringing the at least one layer which can change its surface topography as a result of being brought into contact with at least one medium into contact with at least one medium and after removing the at least one medium, the at least one layer whose surface topography can be coated with at least one further layer. This at least one further layer may be identical, within the meaning of the definition given above, to the at least one layer which can change its surface topography as a result of being brought into contact with at least one medium, or may differ therefrom. The at least one further identical layer may then in turn change its surface topography as a result of being brought into contact with at least one medium. When changing the surface topography of the at least one further identical layer, there may furthermore also be a further change in the surface topography of the already changed surface of the at least one layer. The at least one further coating and/or the at least one layer may be brought into contact with at least one medium in targeted fashion. During this targeted contacting, the at least one medium may be identical or different in relation to its chemical composition, respectively being present with a different concentration and/or respectively being present in different amounts. The targeted contacting is typically realized by means of a printing method, typically by means of an inkjet method. If both the at least one further identical layer and the at least one layer are brought into contact with the same at least one medium, this can be implemented by whole-area contacting, for example by placement in the at least one identical medium or by coating with the at least one identical medium. As already described above the at least one further identical layer may also already be present before the first contacting of the at least one layer with the at least one medium, for example as masking means on the at least one layer which can change its surface topography as a result of being brought into contact with the at least one medium. Above-described further coating with at least one further identical layer and contacting with at least one medium in all of the variations described within the scope of this application may be implemented more than once.

The at least one further identical layer can likewise be with a further layer, which differs from the at least one further identical layer and differs from the at least one layer which can change its surface topography as a result of being brought into contact with at least one medium.

This at least one further different layer typically comprises at least one primer coat layer, at least one hardcoat layer, at least one antireflection layer, at least one electrically conductive or semiconducting layer, which may be part of the antireflection layer, at least one coloring layer, at least one antifog layer and/or at least one cleancoat layer. A thin glass is also suitable for the further different layer, the thin glass having been described in detail in terms of its mean thickness, its surface roughness, its glass composition, its radius of curvature and its surface topography in conjunction with the substrates. By means of an adhesive means described there, the at least one thin glass is bonded to the at least one layer following the change in its surface topography. If only one of the surfaces of the substrate comprises at least one layer, which can change its surface topography as a result of being brought into contact with at least one medium, the respectively opposite surface may comprise at least one of the aforementioned layers.

If the at least one further different layer comprises at least one chemically modified primer coat layer, use is typically made of a coating composition which comprises
i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion,
ii) at least one solvent,
iii) at least one base and
iv) optionally at least one additive.

The proportion of the at least one aqueous aliphatic, cycloaliphatic, aromatic or heteroaromatic polyurethane dispersion, the at least one aqueous aliphatic, cycloaliphatic, aromatic or heteroaromatic polyurea dispersion, the at least one aqueous aliphatic, cycloaliphatic, aromatic or heteroaromatic polyurethane-polyurea dispersion and/or the at least one aqueous aliphatic, cycloaliphatic, aromatic or heteroaromatic polyester dispersion in the coating composition usable for production of the at least one chemically modified primer coat layer typically has a total proportion from a range from 2% by weight to 31% by weight, further typically from a range from 4% by weight to 26% by weight, further typically from a range from 5% by weight to 21% by weight, more typically from a range from 6% by weight to 20% by weight and most typically from a range from 7% by weight to 19% by weight, based in each case on the total weight of the coating composition. The total proportion here includes both the proportion of only one of the dispersions listed above and a mixture of dispersions listed above.

Typically, the coating composition usable for production of the at least one chemically modified primer coat layer comprises an aqueous polyurethane dispersion, where the polyurethane typically includes a polyester unit as spacer. Aqueous polyurethane dispersions for use with preference are disclosed in WO 94/17116 A1, especially in WO 94/17116 A1, page 7 lines 11 to 33. According to WO 94/17116 A1, page 7 lines 11 to 33, an aqueous polyurethane dispersion is typically a polyurethane-polyurea, i.e. a polymer characterized by the occurrence both of urethane and urea groups in a macromolecular chain. The aqueous polyurethane dispersion may have been stabilized with an anionically stabilized acrylic emulsion, as disclosed, for example, in WO 94/17116 A1, especially in WO 94/17116 A1, page 7 lines 33 to 35.

The proportion of the at least one solvent in the coating composition usable for production of the at least one chemically modified primer coat layer is typically within a range from 69% by weight to 98% by weight, further typically within a range from 73% by weight to 96% by weight, more typically within a range from 76% by weight to 94% by weight and most typically within a range from 79% by weight to 93% by weight, based in each case on the total weight of the coating composition. The aforementioned proportions are applicable both to the use of a mixture of different solvents and to the use of a single solvent.

The coating composition usable for production of the at least one chemically modified primer coat layer typically comprises at least one organic solvent having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Typical organic solvents having a low boiling point are methanol, ethanol, 1-propanol and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Typical solvents having a moderate boiling point are 1-methoxy-2-propanol and/or 4-hydroxy-4-methyl-2-pentanone. The weight ratio of the at least one organic solvent having a low boiling point to at least one organic solvent having a moderate boiling point is typically 1:1, further typically 1:1.4, more typically 1:1.5 and most typically 1:1.7.

The coating composition usable for production of the at least one chemically modified primer coat layer may additionally comprise water as solvent as well as at least one organic solvent having a low boiling point and at least one organic solvent having a moderate boiling point. In this case, the weight ratio of the at least one organic solvent having a low boiling point to at least one organic solvent having a moderate boiling point to water is typically 2:7:1, further typically 2.5:6.5:1, further typically 3:6:1, more typically 3:5:1 and most typically 3:6:1.

The coating composition for production of the at least one chemically modified primer coat layer comprises at least one base that typically imparts a pH-buffering effect to the at least one chemically modified primer coat layer and hence slows, typically prevents, contact of pH-acidic components with a layer closer to the substrate. The coating composition for production of the at least one chemically modified primer coat layer comprises the at least one base in a proportion from typically a range from 0.1% by weight to 3.2% by weight, further typically from a range from 0.2% by weight to 2.8% by weight, further typically from a range from 0.3% by weight to 2.4% by weight, more typically from a range from 0.4% by weight to 1.9% by weight and most typically from a range from 0.5% by weight to 1.6% by weight, based in each case on the total weight of the coating composition. The aforementioned proportions are applicable either in the case of use of a single type of base or in the case of use of a mixture of different bases.

The coating composition for production of the at least one chemically modified primer coat layer may comprise, for example, imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-aminopyridine, 4-methylpyridine, 4-methoxypyridine, 2,4,6-trimethylpyridine, piperidine, piperazine, triethylamine, diisopropylamine, diisobutylamine, sodium hydroxide solution and/or potassium hydroxide solution as base. The at least one chemically modified primer coat layer typically comprises at least one base selected from the group consisting of 2-methylimidazole, imidazole, 1-methylimidazole, 4-methylimidazole, 2,5-dimethylimidazole, triethylamine or sodium hydroxide solution, more typically at least one base selected from the group consisting of 2-methylimidazole, 1-methylimidazole, 4-methylimidazole and sodium hydroxide solution. Most typically, the coating composition for production of the at least one chemically modified primer coat layer comprises at least one base selected from the group consisting of 2-methylimidazole and 1-methylimidazole in a proportion from a range from 0.1% by weight to 2% by weight, typically from a range from 0.3% by weight to 1.5% by weight, based in each case on the total weight of the coating composition for production of the at least one chemically modified primer coat layer. The aforementioned proportions are applicable either to the proportion of a mixture comprising 2-methylimidazole and 1-methylimidazole or to the proportion of 2-methylimidazole or 1-methylimidazole.

The coating composition for production of the at least one chemically modified primer coat layer may optionally comprise at least one additive. The at least one additive here may be a dispersant, an antisettling agent, a wetting agent, including an anti-crater additive or a leveling additive, a biocide and/or a UV absorber. The coating composition for production of the at least one chemically modified primer coat layer comprises the at least one additive optionally present typically in a proportion from a range from 0.01% by weight to 1.7% by weight, further typically in a proportion from a range from 0.07% by weight to 1.4% by weight, more typically in a proportion from a range from 0.09% by weight to 1.1% by weight and most typically in a proportion from a range from 0.1% by weight to 0.7% by weight, based in each case on the total weight of the coating composition. The aforementioned proportions are applicable either to the use of one type of additive or to the use of a mixture of different additives.

The proportions of the individual components described above are used in such a way that they add up to 100% by weight in the coating composition to be used for the production of the at least one chemically modified primer coat layer.

If the at least one further different layer comprises at least one primer coat layer, the production thereof typically uses a coating composition which comprises
   i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion,
   ii) at least one solvent, and
   iii) optionally at least one additive.

The proportion of the at least one aqueous aliphatic, cycloaliphatic, aromatic or heteroaromatic polyurethane dispersion, the at least one aqueous aliphatic, cycloaliphatic, aromatic or heteroaromatic polyurea dispersion, the at least one aqueous aliphatic, cycloaliphatic, aromatic or heteroaromatic polyurethane-polyurea dispersion and/or the at least one aqueous aliphatic, cycloaliphatic, aromatic or heteroaromatic polyester dispersion in the coating composition usable for production of the at least one primer coat layer typically has a total proportion from a range from 2% by weight to 38% by weight, further typically from a range from 4% by weight to 34% by weight, further typically from a range from 5% by weight to 28% by weight, more typically from a range from 6% by weight to 25% by weight and most typically from a range from 7% by weight to 21% by weight, based in each case on the total weight of the coating composition. The total proportion here includes both the proportion of only one of the dispersions listed above and a mixture of dispersions listed above.

Typically, the coating composition usable for production of the at least one primer coat layer comprises an aqueous polyurethane dispersion, where the polyurethane typically includes a polyester unit as spacer. Aqueous polyurethane dispersions for use with preference are disclosed in WO 94/17116 A1, especially in WO 94/17116 A1, page 7 lines 11 to 33. The aqueous polyurethane dispersion may have been stabilized with an anionically stabilized acrylic emulsion, as disclosed, for example, in WO 94/17116 A1, especially in WO 94/17116 A1, page 7 lines 33 to 35.

The proportion of the at least one solvent in the coating composition usable for production of the at least one primer coat layer is typically within a range from 69% by weight to 98% by weight, further typically within a range from 68% by weight to 99% by weight, more typically within a range from 81% by weight to 97% by weight and most typically within a range from 89% by weight to 93% by weight, based in each case on the total weight of the coating composition. The aforementioned proportions are applicable both to the use of a mixture of different solvents and to the use of a single solvent.

The coating composition usable for production of the at least one primer coat layer typically comprises at least one organic solvent having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Typical organic solvents having a low boiling point are methanol, ethanol, 1-propanol and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Typical solvents having a moderate boiling point are 1-methoxy-2-propanol and/or 4-hydroxy-4-methyl-2-pentanone.

The weight ratio of the at least one organic solvent having a low boiling point to at least one organic solvent having a moderate boiling point is typically 1:1, further typically 1:1.4, more typically 1:1.5 and most typically 1:1.7.

The coating composition usable for production of the at least one primer coat layer may additionally comprise water as solvent as well as at least one organic solvent having a low boiling point and at least one organic solvent having a moderate boiling point. In this case, the weight ratio of the at least one organic solvent having a low boiling point to at least one organic solvent having a moderate boiling point to water is typically 2:7:1, further typically 2.5:6.5:1, further typically 3:6:1, more typically 3:5:1 and most typically 3:6:1.

The coating composition for production of the at least one primer coat layer may optionally comprise at least one additive. The at least one additive here may be a dispersant, an antisettling agent, a wetting agent, including an anticrater additive or a leveling additive, a biocide, a UV absorber and/or a mixture thereof. The coating composition for production of the at least one primer coat layer comprises the at least one additive optionally present typically in a proportion from a range from 0.01% by weight to 1.7% by weight, further typically in a proportion from a range from 0.07% by weight to 1.4% by weight, more typically in a proportion from a range from 0.09% by weight to 1.1% by weight and most typically in a proportion from a range from 0.1% by weight to 0.7% by weight, based in each case on the total weight of the coating composition. The aforementioned proportions are applicable either to the use of one type of additive or to the use of a mixture of different additives.

The proportions of the individual components described above are used in such a way that they add up to 100% by weight in the coating composition to be used for the production of the at least one primer coat layer.

If the at least one further different, in addition or as an alternative to one of the two above-described primer coat layers, comprises at least one hardcoat layer, a composition as described in EP 2 578 649 A1, in particular claim 1 of EP 2 578 649 A1, is used for the production thereof. More typically, the composition for the production of the at least one hardcoat layer comprises a) at least one silane derivative of the formula R1R23-nSi(OR3)n where R1 is an unsubstituted or substituted alkyl group, cycloalkyl group, acyl group, alkyleneacyl group, aryl group or alkylenearyl group, R2 is an organic radical comprising an epoxy group, R3 is an unsubstituted or substituted alkyl group, cycloalkyl group, aryl group or alkylenearyl group and n=2 or 3, and/or a hydrolysis product and/or a condensation product of the silane derivative of the formula R1R23-nSi(OR3)n,
b) at least one colloidal inorganic oxide, hydroxide, oxide hydrate, fluoride and/or oxyfluoride,
c) at least one epoxy compound having at least two epoxy groups, and
d) at least one catalyst system comprising at least one Lewis acid and at least one thermolatent Lewis acid-base adduct.

The above-described composition for the production of the at least one hardcoat layer comprises the at least one silane derivative of the formula R1R23-nSi(OR3)n and/or the hydrolysis product and/or condensation product thereof typically in a proportion from a range from 9% by weight to 81% by weight, further typically from a range from 13% by weight to 76% by weight, more typically from a range from 19% by weight to 71% by weight and most typically from a range from 23% by weight to 66% by weight, based in each case on the total weight of the composition. The aforementioned proportions are based either on the use of one type of silane derivative of the formula R1R23-nSi(OR3)n and/or the hydrolysis product thereof and/or the condensation product thereof or on the use of a mixture of different silane derivatives of the formula R1R23-nSi(OR3)n and/or the respective hydrolysis product thereof and/or the respective condensation product thereof. Silane derivatives used may be, for example, 3-glycidoxymethyltrimethoxysilane, 3-glycidoxypropyltrihydroxysilane, 3-glycidoxypropyl-dimethylhydroxysilane, 3-glycidoxypropyldimethylethoxysilane, 3-glycidoxypropylmethyl-diethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane and/or 2-(3,4-epoxycyclohexyl)ethyltrimethoxysilane. The silane derivative used is typically 3-glycidoxypropyltrimethoxysilane and/or 3-glycidoxypropyltriethoxysilane.

The above-described composition for the production of the at least one hardcoat layer comprises the at least one colloidal inorganic oxide, hydroxide, oxide hydrate, fluoride and/or oxyfluoride typically in a proportion from a range from 3% by weight to 60% by weight, further typically from a range from 6% by weight to 58% by weight, more typically from a range from 9% by weight to 57% by weight and most typically from a range from 13% by weight to 55% by weight, based in each case on the total weight of the composition. The aforementioned proportions are applicable either in the case of use of a single type of colloidal inorganic oxide, hydroxide, oxide hydrate, fluoride and/or oxyfluoride or in the case of use of a mixture of different colloidal inorganic oxides, hydroxides, oxide hydrates, fluorides and/or oxyfluorides. The inorganic oxide, hydroxide, oxide hydrate may, for example, be a metal oxide, metal hydroxide and/or metal oxide hydrate of or including titanium, typically $TiO_2$, of or including silicon, typically $SiO_2$, of or including zirconium, typically $ZrO_2$, of or including tin, typically $SnO_2$, of or including antimony, typically $Sb_2O_3$, of or including aluminum, typically $Al_2O_3$ or AlO(OH), and/or mixed oxides and/or mixtures thereof. The inorganic oxide, hydroxide, oxide hydrate used is typically a metal oxide, metal hydroxide, metal oxide hydrate of or including titanium, of or including silicon, of or including zirconium, and/or mixtures thereof. The inorganic oxide, hydroxide, oxide hydrate used is more typically a metal oxide, metal hydroxide, metal oxide hydrate of or including silicon, most typically $SiO_2$. Further typically, the inorganic oxide, hydroxide, oxide hydrate has a core-shell structure. In this case, the core typically comprises a metal oxide, metal hydroxide and/or metal oxide hydrate of or including titanium, typically $TiO_2$, or of or including zirconium, typically $ZrO_2$, and the shell typically comprises a metal oxide, metal hydroxide and/or metal oxide hydrate of or including silicon. The inorganic fluoride may, for example, be magnesium fluoride. The at least one colloidal inorganic oxide, hydroxide, oxide hydrate, fluoride and/or oxyfluoride typically in each case has a mean particle size from a range from 3 nm to 70 nm, further typically from a range from 6 nm to 64 nm, more typically from a range from 8 nm to 56 nm and most typically from a range from 9 nm to 52 nm.

The above-described composition for the production of the at least one hardcoat layer comprises the at least one epoxy compound typically in a proportion from a range from 0.01% by weight to 14% by weight, further typically from a range from 0.07% by weight to 11% by weight, more typically from a range from 0.1% by weight to 6% by weight and most typically from a range from 0.2% by weight to 3% by weight, based in each case on the total weight of the composition. The aforementioned proportions are applicable either in the case of use of a single type of epoxy compound or of a mixture of different epoxy compounds. The at least one epoxy compound may comprise, for example, diglycidyl ether, ethylene glycol diglycidyl ether, propylene glycol diglycol glycidyl ether, butane-1,4-diol diglycidyl ether, hexane-1,6-diol diglycidyl ether, trimethylolpropane triglycidyl ether, triglycidylglycerol and/or trimethylolethane triglycidyl ether. The at least one epoxy compound typically comprises trimethylolpropane triglycidyl ether, butanediol diglycidyl ether and/or hexane-1,6-diol diglycidyl ether.

The above-described composition for the production of the at least one hardcoat layer comprises the at least one catalyst system typically in a proportion from a range from 0.04% by weight to 4% by weight, further typically from a range from 0.1% by weight to 3% by weight, more typically from a range from 0.2% by weight to 2% by weight and most typically from a range from 0.3% by weight to 1% by weight, based in each case on the total weight of the composition. In the at least one catalyst system, the weight ratio of the at least one Lewis acid to the at least one thermolatent Lewis base adduct is typically 20:1 to 2:1, further typically 18:1 to 1:2, more typically 13:1 to 1:1 and most typically 6:1 to 1:1. The at least one Lewis acid used may, for example, be ammonium perchlorate, magnesium perchlorate, sulfonic acids and/or sulfonic salts, such as trifluoromethanesulfonic acids and/or salts thereof. The at least one Lewis acid used is typically ammonium perchlorate and/or magnesium perchlorate. The at least one thermolatent Lewis acid-base adduct used may, for example, be at least one metal complex, such as aluminum acetylacetonate, iron acetylacetonate and/or zinc acetylacetonate. The at least one thermolatent Lewis acid-base adduct used is typically aluminum acetylacetonate and/or iron acetylacetonate.

The above-described composition for the production of the at least one hardcoat layer may further comprise at least one organic solvent and/or water. The proportions of the individual components described above are used in such a way that they add up to 100% by weight in the composition to be used for the production of the at least one hardcoat layer.

As an alternative to the above-described composition for the production of the at least one hardcoat layer, a composition according to U.S. Pat. No. 3,986,997 A, especially according to U.S. Pat. No. 3,986,997 A, example 7, may be used. As a further alternative, for the production of the at least one hardcoat layer, it is possible to use a composition according to WO 98/46692 A1, especially according to WO 98/46692 A1, example 21, or according to U.S. Pat. No. 6,538,092 B1, especially according to U.S. Pat. No. 6,538,092 B1, example 1.

If the at least one further layer, as an alternative or in addition to one of the above-described primer coat layers and/or to one of the above-described hardcoat layers, comprises at least one antireflection layer, this layer, which is typically furthest from the substrate, typically comprises alternating discrete metal oxide, metal hydroxide and/or metal oxide hydrate layers of or including iron, tin, nickel, molybdenum, cerium, copper, aluminum, silicon, zirconium, titanium, yttrium, tantalum, neodymium, lanthanum, niobium and/or praseodymium. Typically, the at least one antireflection layer comprises at least one metal oxide, metal hydroxide and/or metal oxide hydrate layer of or including silicon, where this at least one silicon oxide, silicon hydroxide and/or silicon oxide hydrate layer on the front surface typically forms the layer of the at least one antireflection layer on the object side, or, on the back surface, typically the outer layer on the eye side. The outer layer in this connection is understood to mean that layer of the antireflection layer which is furthest to the eye side or furthest to the object side in the layer sequence. The at least one antireflection layer typically has a total layer thickness from a range from 97 nm to 420 nm, typically from a range from 102 nm to 360 nm, further typically from a range of 111 nm to 310 nm, more typically from a range of 122 nm to 270 nm and most typically from a range of 131 nm to 223 nm.

The at least one antireflection layer may, for example, have the following layer sequence from facing the substrate to remote from the substrate:
 a) metal oxide, metal hydroxide and/or metal oxide hydrate layer of or including titanium,
 b) metal oxide, metal hydroxide and/or metal oxide hydrate layer of or including silicon,
 c) metal oxide, metal hydroxide and/or metal oxide hydrate layer of or including titanium,
 d) metal oxide, metal hydroxide and/or metal oxide hydrate layer of or including silicon,
 e) metal oxide, metal hydroxide and/or metal oxide hydrate layer of or including titanium,
 f) metal oxide, metal hydroxide and/or metal oxide hydrate layer of or including silicon.

The at least one antireflection layer may also have the layer sequence and layer thickness indicated in EP 2 437 084 A1, in FIGS. 3 and 5, in each case between the superhydrophobic layer and the hardcoat layer. Typically, in the context of this disclosure, the layer that adjoins the hardcoat layer therein in each case on the eye side and the layer that adjoins the superhydrophobic layer in each case on the object side is disposed on the front surface, and the layer that adjoins the hardcoat layer therein in each case on the object side and the layer that adjoins the superhydrophobic layer in each case on the eye side is disposed on the back surface in the layer sequence.

If the at least one further different layer, in addition or as an alternative to the layers already described in more detail above, comprises at least one electrically conductive or semiconducting layer, which may also be a constituent part of the at least one antireflection layer, this typically comprises a layer of or including indium tin oxide (($In_2O_3$)$_{0.9}$ ($SnO_2$)$_{0.1}$; ITO), fluorine-doped tin oxide ($SnO_2$:F; FTO), aluminum-doped zinc oxide (ZnO:Al; AZO) and/or antimony-doped tin oxide ($SnO_2$:Sb; ATO). Particularly typically, the electrically conductive or semiconducting layer comprises a layer of or including ITO or of or including FTO.

If the at least one further different layer, in addition or as an alternative to the above-described further layers, comprises at least one cleancoat layer, the latter typically comprises a material having oleophobic and hydrophobic properties, as disclosed, for example, in EP 1 392 613 A1, on which water assumes a contact angle of more than 90°, typically of more than 100° and more typically more than 110°. The at least one cleancoat layer more typically comprises an organofluorine layer with covalent attachment to the substrate according to DE 198 48 591 A1, claim 1, or a layer based on perfluoropolyethers.

If the at least one further different layer, in addition or as an alternative to the above-described further layers, comprises at least one antifog layer, the latter typically comprises a silane derivative according to EP 2 664 659 A1, particularly typically according to claim 4 of EP 2 664 659 A1. Alternatively, the at least one antifog layer may also be produced by the process described in DE 10 2015 209 794 A1, especially by the process described in claim 1 of DE 10 2015 209 794 A1.

Alternatively, the at least one cleancoat layer or the at least one antifog layer typically represents the layer furthest from the substrate in the layer sequence of the coating.

If the refractive index of the at least one coating of the masking means corresponds to the refractive index of the at least one layer which can change its surface topography as a result of being brought into contact with at least one medium, this at least one coating of the masking means is typically removed prior to further coating because otherwise the created changes in the surface topography might no longer be optically effective.

If the refractive index of the at least one coating of the masking means does not correspond to the refractive index of the at least one layer which can change its surface topography as a result of being brought into contact with at least one medium, subsequent further coatings may be implemented on the at least one coating of the masking means. In this case, as already described above, the respective layer thickness and the distance of the changed surface topography from the unchanged surface are taken into account.

As already mentioned at the outset, the change in the surface topography is typically irreversible. Following the coating with at least one of the aforementioned further different layers, this irreversible change of the surface topography also exhibits long-term stability over a period of time of at least 8 months at room temperature, that is to say a temperature of 22° C.±2° C.

Bringing the at least one layer which can change its surface topography into contact with at least one medium facilitates the production of a product comprising
(i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of a spectacle lens in the form of computer-readable data and instructions for using the spectacle lens or
(vii) a representation of the spectacle lens in the form of a computer-readable data signal or
(viii) a representation of the spectacle lens in the form of a computer-readable data signal and instructions for using the spectacle lens, wherein in each case
the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which at least one layer, as a result of being brought into contact with at least one medium, forms a plurality of independent island-shaped regions within a radius around the distance visual point in the case of single-vision lenses or about the prism reference point in the case of multifocal lenses or power-variation lenses of in each case 0.5 cm to 2.0 cm,
the spectacle lens satisfies at least one of the following optical requirements:
(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4,
(4) the independent island-shaped regions each image an image at a position that differs from the retina of the eye, wherein the spectacle lens satisfies at least one of optical requirements (1) to (3) and the optical requirement (4).

The plurality of independent regions, typically the plurality of independent regions analogous to US 2017/0131567 A1, are obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry.

The content of the sections of DIN EN ISO 8980-1:2017 and DIN EN ISO 8980-2:2017 cited above is reproduced below:

DIN EN ISO 8980-1:2017, section 5.2.2 "Back vertex power"

When verified according to 5.2.1, spectacle lenses shall comply with the tolerances on the power of each principal meridian (see table 1, second column), and with the tolerances on the cylindrical power (see table 1, third to sixth column), using the method specified in 6.2.

TABLE 2

Tolerances on the back vertex power of spectacle lenses

| Power of principal meridian with higher absolute back vertex power | Tolerance on the back vertex power of each principal meridian | Tolerance on the absolute cylindrical power | | | |
|---|---|---|---|---|---|
| | | ≥0.00 and ≤0.75 | >0.75 and ≤4.00 | >4.00 and ≤6.00 | >6.00 |
| ≥0.00 and ≤3.00 | ±0.12 | ±0.09 | ±0.12 | ±0.18 | — |
| >3.00 and ≤6.00 | ±0.12 | ±0.12 | ±0.12 | ±0.18 | ±0.25 |
| >6.00 and ≤9.00 | ±0.12 | ±0.12 | ±0.18 | ±0.18 | ±0.25 |
| >9.00 and ≤12.00 | ±0.18 | ±0.12 | ±0.18 | ±0.25 | ±0.25 |
| >12.00 and ≤20.00 | ±0.25 | ±0.18 | ±0.25 | ±0.25 | ±0.25 |
| >20.00 | ±0.37 | ±0.25 | ±0.25 | ±0.37 | ±0.37 |

Values in diopters (D)

DIN EN ISO 8980-1:2017, section 5.2.3 "Direction of the cylinder axis"

When verified according to 5.2.1 and using the method specified in 6.3, the direction of the cylinder axis shall comply with the tolerances specified in table 2. The cylinder axis shall be specified in accordance with ISO 8429.

These tolerances apply to multifocal lenses and to single-vision lenses with a predetermined orientation, e.g. prism base setting, and/or position-specific single-vision lenses. NOTE There are no requirements for the direction of the cylinder axis for cylindrical powers of less than 0.12 D.

TABLE 3

Tolerances on the direction of the cylinder axis

| | Absolute cylindrical power diopters (D) | | | | |
|---|---|---|---|---|---|
| | <0.12 | ≥0.12 and ≤0.25 | >0.25 and ≤0.50 | >0.50 and ≤0.75 | >0.75 and ≤1.50 | >1.50 |
| Tolerance on the direction of the cylinder axis degrees (°) | No requirement | ±14 | ±7 | ±5 | ±3 | ±2 |

DIN EN ISO 8980-1:2017-12, section 5.2.4 "Prismatic power"

When verified according to 5.2.1 and using the method specified in 6.5, the addition power shall comply with the tolerances specified in table 3.

TABLE 4

Tolerances on the addition power for multifocal lenses

| Value of the addition power | ≤4.00 | >4.00 |
|---|---|---|
| Tolerance | ±0.12 | ±0.18 |

Values in diopters (D)

DIN EN ISO 8980-1:2017-12, section 5.2.5 "Prismatic power"

When verified according to 5.2.1 and using the method specified in 6.4, the total prism (including ordered and thickness reduction prism) shall comply with the tolerance(s) given in table 4. Spectacle lenses with no ordered prism are also included.

To determine the prismatic power tolerances, first the value S of the higher absolute principal power is found. Then:
a) for single-vision lenses with no specific orientation, the row in table 4 is chosen according to the value of the total prism and the tolerance selected from the second column;
b) for position-specific single-vision lenses and multifocal lenses:
1) if ordered as an oblique prism, the ordered prism is resolved into its horizontal and vertical components;
2) the row in table 4 is chosen according to the value of the horizontal component of the total prism and the tolerance of the horizontal component selected from the third column;
3) the row in table 4 is chosen according to the value of the vertical component of the total prism and the tolerance of the vertical component selected from the fourth column.

TABLE 4

Tolerances on the prismatic power

| Higher total prism component value | Type of spectacle lens | | |
|---|---|---|---|
| | Single-vision lens | Multifocal and position-specific single-vision lenses | |
| | | Horizontal component | Vertical component |
| ≥0.00 to ≤2.00 | ±[0.25 + (0.1 × S)] | ±[0.25 + (0.1 × S)] | ±[0.25 + (0.05 × S)] |
| >2.00 to ≤10.00 | ±[0.37 + (0.1 × S)] | ±[0.37 + (0.1 × S)] | ±[0.37 + (0.05 × S)] |
| >10.00 | ±[0.50 + (0.1 × S)] | ±[0.50 + (0.1 × S)] | ±[0.50 + (0.05 × S)] |

Values in diopters (Δ)
NOTE 1
S is the focal power, in diopters, in the meridian of higher absolute principal power.
NOTE 2
(0.1 × S) corresponds to the prismatic effect of 0.1 cm (1 mm) displacement, while (0.05 × S) corresponds to the prismatic effect of 0.05 cm (0.5 mm) displacement.

NOTE An example of applying the tolerances in table 4 to a distance power of +0.50 D sphere/−2.50 D cylinder axis 20° in a multifocal lens with a prismatic power of not greater than 2.00Δ is as follows:

For this prescription, the principal powers are +0.50 D and −2.00 D so that higher absolute principal power is 2.00 D. For a power of 2.00 D, the horizontal tolerance is ±[0.25+(0.1×2.00)]=±0.45Δ. The vertical tolerance is ±[0.25+(0.05×2.00)]=±0.35Δ.

DIN EN ISO 8980-2:2017-12, section 5.2.2 "Back vertex power of power-variation lenses at the primary reference point"

When verified according to 5.2.1, spectacle lenses shall comply with the tolerances on the power of each principal meridian (see table 1, second column), and with the tolerances on the cylindrical power (see table 1, third to sixth column), using the method specified in 6.2.

TABLE 2

Tolerances on the back vertex power of power-variation lenses

| Power of principal meridian with higher absolute back vertex power | Tolerance on the back vertex power of each principal meridian | Tolerance on the absolute cylindrical power | | | |
|---|---|---|---|---|---|
| | | ≥0.00 and ≤0.75 | >0.75 and ≤4.00 | >4.00 and ≤6.00 | >6.00 |
| ≥0.00 and ≤6.00 | ±0.12 | ±0.12 | ±0.18 | ±0.18 | ±0.25 |
| >6.00 and ≤9.00 | ±0.18 | ±0.18 | ±0.18 | ±0.18 | ±0.25 |
| >9.00 and ≤12.00 | ±0.18 | ±0.18 | ±0.18 | ±0.25 | ±0.25 |
| >12.00 and ≤20.00 | ±0.25 | ±0.18 | ±0.25 | ±0.25 | ±0.25 |
| >20.00 | ±0.37 | ±0.25 | ±0.25 | ±0.37 | ±0.37 |

Values in diopters (D)

DIN EN ISO 8980-2:2017-12, section 5.2.3 "Direction of the cylinder axis"

When verified according to 5.2.1 and using the method specified in 6.3, the direction of the cylinder axis shall comply with the tolerances specified in table 2. The direction of the cylinder axis shall be specified in accordance with ISO 8429.

NOTE There are no requirements for the direction of the cylinder axis for cylindrical power of less than 0.12 D.

TABLE 2

Tolerances on the direction of the cylinder axis

| | Absolute cylindrical power diopters (D) | | | | |
|---|---|---|---|---|---|
| | <0.12 | ≥0.12 and ≤0.25 | >0.25 and ≤0.50 | >0.50 and ≤0.75 | >0.75 and ≤1.50 | >1.50 |
| Tolerance on the direction of the cylinder axis degrees (°) | No requirement | ±14 | ±7 | ±5 | ±3 | ±2 |

DIN EN ISO 8980-2:2017-12, section 5.2.4 "Variation power (including addition power)"

When verified according to 5.2.1 and using the method specified in 6.5, the variation (including addition) power shall comply with the tolerances specified in table 3. The tolerance on the variation power for power-variation lenses applies only to lenses having primary and secondary reference points.

TABLE 3

Tolerances on the variation power (including addition power)

| | Value of the variation power (including addition power) | |
| --- | --- | --- |
| | ≤4.00 | >4.00 |
| Tolerance | ±0.12 | ±0.18 |

Values in diopters (D)

DIN EN ISO 8980-2:2017-12, section 5.2.5 "Prismatic power"

When verified according to 5.2.1 at the prism reference point and using the method specified in 6.4, the total prism (including ordered and thickness reduction prism) shall comply with the tolerance(s) given in table 4. Spectacle lenses with no ordered prism are also included.

To determine the prismatic power tolerances, first the value S of the higher absolute principal power is found. Then:
  a) if ordered as an oblique prism, the ordered prism is resolved into its horizontal and vertical components;
  b) the row in table 4 is chosen according to the value of the horizontal component of the total prism and the tolerance of the horizontal component selected from the second column;
  c) the row in table 4 is chosen according to the value of the vertical component of the total prism and the tolerance of the vertical component selected from the third column.

TABLE 4

Tolerances on the prismatic power

| Higher total prism component value | Horizontal component | Vertical component |
| --- | --- | --- |
| ≥0.00 and ≤2.00 | ±[0.25 + (0.1 × S)] | ±[0.25 + (0.05 × S)] |
| >2.00 and ≤10.00 | ±[0.37 + (0.1 × S)] | ±[0.37 + (0.05 × S)] |
| >10.00 | ±[0.50 + (0.1 × S)] | ±[0.50 + (0.05 × S)] |

Values in prism diopters (Δ)
NOTE 1
S is the focal power, in diopters, in the meridian of higher absolute principal power.
NOTE 2
(0.1 × S) corresponds to the prismatic effect of 0.1 cm (1 mm) displacement, while (0.05 × S) corresponds to the prismatic effect of 0.05 cm (0.5 mm) displacement.

NOTE An example of applying the tolerances given in table 4 to a distance power of +0.50 D sphere/−2.50 D cylinder axis 20° in a progressive lens with a prismatic power of not greater than 2.00Δ is as follows:

For this prescription, the principal powers are +0.50 D and −2.00 D so that higher absolute principal power is 2.00 D. For a power of 2.00 D, the horizontal tolerance is ±[0.25+(0.1×2.00)]=±0.45Δ. The vertical tolerance is ±[0.25+(0.05×2.00)]=±0.35Δ.

In a further exemplay embodiment, bringing the at least one layer which can change its surface topography into contact with at least one medium facilitates the production of a product comprising (i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of the spectacle lens in the form of computer-readable data and with instructions for using the spectacle lens or
(vii) a representation of the spectacle lens in the form of a computer-readable data signal or
(viii) a representation of the spectacle lens in the form of a computer-readable data signal and instructions for using the spectacle lens, wherein in each case:
the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which layer forms a plurality of at least three noncontiguous optical elements as a result of being brought into contact with at least one medium,
the spectacle lens satisfies at least one of the following optical requirements:
(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4, (4) at least one of the optical elements has a non-spherical optical power, wherein the spectacle lens satisfies at least one of optical requirements (1) to (3) and the optical requirement (4).

The plurality of at least three noncontiguous optical elements, typically the plurality of at least three noncontiguous optical elements analogous to WO 2019/166653 A1, are obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry. Furthermore, the front surface and/or the back surface of the substrate, typically the front surface of the substrate, which comprises at least one layer, in each case at least in part or in each case over the whole area, which layer forms a plurality of at least three noncontiguous optical elements analogous to WO 2019/166653 A1, claim 1, after having been brought into contact with at least one medium, may comprise at least one optical element which has one of the properties listed on page 2, line 11—page 5, line 21 of WO 2019/166653 A1.

In a further exemplay embodiment, bringing the at least one layer which can change its surface topography into contact with at least one medium facilitates the production of a product comprising
(i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of the spectacle lens in the form of computer-readable data and with instructions for using the spectacle lens or
(vii) a representation of the spectacle lens in the form of a computer-readable data signal or
(viii) a representation of the spectacle lens in the form of a computer-readable data signal and instructions for using the spectacle lens, wherein in each case:
the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which layer comprises a plurality of at least three optical elements after being brought into contact with at least one medium,
the spectacle lens satisfies at least one of the following optical requirements:
(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4,
(4) at least one of the optical elements has an optical power such that an image is not imaged onto the retina of the eye, wherein
the spectacle lens satisfies at least one of optical requirements (1) to (3) and the optical requirement (4).

The plurality of at least three optical elements, typically the plurality of at least three optical elements analogous to WO 2019/166654 A1, are obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry. Furthermore, the front surface and/or the back surface of the substrate, typically the front surface of the substrate, which comprises at least one layer, in each case at least in part or in each case over the whole area, which layer forms a plurality of at least three noncontiguous optical elements analogous to WO 2019/166654 A1, claim 1, after having been brought into contact with at least one medium, may comprise at least one optical element which has one of the properties listed on page 2, line 19—page 6, line 3 of WO 2019/166654 A1.

In a further exemplay embodiment, bringing the at least one layer which can change its surface topography into contact with at least one medium facilitates the production of a product comprising
(i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of the spectacle lens in the form of computer-readable data and with instructions for using the spectacle lens or (vii) a representation of the spectacle lens in the form of a computer-readable data signal or
(viii) a representation of the spectacle lens in the form of a computer-readable data signal and instructions for using the spectacle lens, wherein in each case:
the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which layer comprises a plurality of at least three optical elements after being brought into contact with at least one medium,
the spectacle lens satisfies at least one of the following optical requirements:
(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4,
(4) the optical elements are formed such that the spherical refractive power of the optical elements along a section of the spectacle lens increases in the direction of the periphery of this section, wherein
the spectacle lens satisfies at least one of optical requirements (1) to (3) and the optical requirement (4).

The plurality of at least three optical elements, typically the plurality of at least three optical elements analogous to WO 2019/166655 A1, are obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry.

Furthermore, the front surface and/or the back surface of the substrate, typically the front surface of the substrate, which comprises at least one layer, in each case at least in part or in each case over the whole area, which layer forms a plurality of at least three optical elements analogous to WO 2019/166655 A1, claim 1, after having been brought into contact with at least one medium, may comprise at least one optical element which has one of the properties listed on page 2, line 20—page 6, line 12 of WO 2019/166655 A1.

In a further exemplay embodiment, bringing the at least one layer which can change its surface topography into contact with at least one medium facilitates the production of a product comprising
(i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of the spectacle lens in the form of computer-readable data and with instructions for using the spectacle lens or
(vii) a representation of the spectacle lens in the form of a computer-readable data signal or
(viii) a representation of the spectacle lens in the form of a computer-readable data signal and instructions for using the spectacle lens, wherein in each case:
the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which layer comprises a plurality of at least three optical elements after being brought into contact with at least one medium,
the spectacle lens satisfies at least one of the following optical requirements:
(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4, (4) at least one of the optical elements has the optical power of not imaging an image onto the retina of the eye, both under standard wear conditions and for peripheral vision, wherein the spectacle lens satisfies at least one of optical requirements (1) to (3) and the optical requirement (4).

The plurality of at least three optical elements, typically the plurality of at least three optical elements analogous to WO 2019/166657 A1, is obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry. Furthermore, the front surface and/or the back surface of the substrate, typically the front surface of the substrate, which comprises at least one layer, in each case at least in part or in each case over the whole area, which layer forms a plurality of at least three optical elements analogous to WO 2019/166657 A1, claim 1, after having been brought into contact with at least one medium, may comprise at least one optical element which has one of the properties listed on page 2, line 26—page 6, line 5 of WO 2019/166657 A1.

In a further exemplay embodiment, bringing the at least one layer which can change its surface topography into contact with at least one medium facilitates the production of a product comprising (i) a spectacle lens or
(ii) a spectacle lens and instructions for using the spectacle lens or
(iii) a representation of the spectacle lens in the form of computer-readable data located on a data medium or
(iv) a representation of the spectacle lens in the form of computer-readable data located on a data medium and instructions for using the spectacle lens or
(v) a data medium with a virtual representation of the spectacle lens in the form of computer-readable data or
(vi) a data medium with a virtual representation of the spectacle lens in the form of computer-readable data and with instructions for using the spectacle lens or
(vii) a representation of the spectacle lens in the form of a computer-readable data signal or
(viii) a representation of the spectacle lens in the form of a computer-readable data signal and instructions for using the spectacle lens, wherein in each case:

the spectacle lens comprises a substrate with a front surface and a back surface,
the front surface of the substrate has a spherical surface geometry, an aspherical surface geometry, a toric surface geometry, an atoric surface geometry, a plane surface geometry or a free-form surface geometry,
the back surface of the substrate has a spherical surface geometry, an aspherical surface geometry, a toric surface geometry, an atoric surface geometry, a plane surface geometry or a free-form surface geometry,
the front surface and/or the back surface of the substrate comprises at least one layer, in each case at least in part or in each case over the whole area, which layer comprises a plurality of at least two contiguous optical elements after being brought into contact with at least one medium,
the spectacle lens satisfies at least one of the following optical requirements:

(1) no dioptric power,
(2) for a finished single-vision lens or for a finished multifocal lens: a prescribed dioptric power is within the tolerances for the back vertex power pursuant to DIN EN ISO 8980-1:2017-12, section 5.2.2, in particular section 5.2.2, table 1, within the tolerances for the direction of the cylinder axis pursuant to DIN EN ISO 8980-1:2017-12, section 5.2.3, in particular section 5.2.3, table 2, within the tolerances for the addition power for multifocal lenses pursuant to DIN EN ISO 8980-1:2017-12, section 5.2.4, in particular pursuant to section 5.2.4, table 3, and within the tolerances for the prismatic power pursuant to DIN EN ISO 8980-1:2017-12, section 5.2.5, in particular pursuant to section 5.2.5, table 4,
(3) for a finished power-variation lens: a prescribed dioptric power is within the tolerances for the back vertex power of power-variation lenses pursuant to DIN EN ISO 8980-2:2017-12, section 5.2.2, in particular section 5.2.2, table 1, within the tolerances for the direction of the cylinder axis pursuant to DIN EN ISO 8980-2:2017-12, section 5.2.3, in particular section 5.2.3, table 2, within the tolerances for the variation power (including addition power) pursuant to DIN EN ISO 8980-2:2017-12, section 5.2.4, in particular pursuant to section 5.2.4, table 3, and within the tolerances for the prismatic power pursuant to DIN EN ISO 8980-2:2017-12, section 5.2.5, in particular section 5.2.5, table 4,
(4) at least one of the plurality of the at least two contiguous optical elements has the optical power of not focusing an image onto the retina of a spectacles wearer, wherein the spectacle lens satisfies at least one of optical requirements (1) to (3) and the optical requirement (4).

The plurality of at least three optical elements, typically the plurality of at least two contiguous optical elements analogous to WO 2019/166659 A1, is obtained by bringing the surface of the at least one layer situated on the front surface of the substrate into contact with at least one medium. The front surface of the substrate typically has a spherical surface geometry or a plane surface geometry. The back surface of the substrate typically has a spherical surface geometry, a toric surface geometry or a free-form surface geometry. Furthermore, the front surface and/or the back surface of the substrate, typically the front surface of the substrate, which comprises at least one layer, in each case at least in part or in each case over the whole area, which layer forms a plurality of at least three optical elements analogous to WO 2019/166659 A1, claim 1, after having been brought into contact with at least one medium, may comprise at least one optical element which has one of the properties listed on page 2, line 30—page 6, line 25 of WO 2019/166659 A1.

In a further exemplay embodiment, contacting the at least one layer, the surface topography of which can be changed as a result of being brought into contact with at least one medium, facilitates a whole-area change in the surface topography of the at least one layer, as already described above. As a result of the whole-area change of the surface of the at least one layer, it is consequently possible, for example, to produce a spectacle lens with a multi-power surface and a prescription surface, for which the specified dioptric powers of the distance and near reference point are achieved, wherein the prescription surface is a general aspherical surface without point symmetry and axial symmetry and wherein at least the dioptric power of the individual use conditions is taken into account in extensive fashion when determining the geometry of the prescription surface, as described in EP 0 562 336 A1. As a result of the whole-area change in the surface of the at least one layer, it is furthermore possible to produce, for example, a spectacle lens with a spherical or rotationally symmetric aspherical front surface and a back surface serving as a prescription surface, with all individual requirements of the spectacle prescription, consisting of spherical and/or astigmatic and/or prismatic power and the distribution thereof on the prescription surface of the spectacle lens, being satisfied and the back surface of the lens being a multifocal surface without point symmetry and/or axial symmetry, as described in EP 0 857 993 A2. The production of a bifocal lens, as described in WO 2021/010984 A1, can also be achieved by way of changing the surface topography of the at least one layer as a result of bringing the latter into contact with at least one medium. Furthermore, the production of a spectacle lens for obtaining a spherical power according to prescription and an astigmatic power according to prescription, the spectacle lens having a rotationally symmetric spectacle lens front surface and an atoric spectacle lens back surface, as described in EP 3663838 A1, as a result of contacting the surface of the at least one layer which can change its surface topography as a result of being brought into contact with at least one medium is realizable as a result of contacting at least one medium.

In the case of a further exemplay embodiment, each of the spectacle lenses described in the exemplay embodiment above may furthermore experience at least one local change in the surface of the at least one layer which can change its surface topography as a result of being brought into contact with at least one medium as a result of being brought into contact with at least one medium, as explained above. This local change may for example comprise at least one local change analogous to US 2017/131567 A1, WO 2019/166653 A1, WO 2019/166654 A1, WO 2019/166655 A1, WO 2019/166657 A1 and/or WO 2019/166659 A1. This at least one local change may relate to the at least one layer on the front surface and/or on the back surface of the substrate.

In all of the products listed above, the representation of the respective spectacle lens may comprise, in particular, a description of the geometric form and a description of the substrate of the respective spectacle lens. By way of example, such a representation may comprise a mathematical description of the front surface, the back surface, the arrangement of these surfaces with respect to one another, including the thickness, and the edge of the respective spectacle lens, and the refractive index distribution of the substrate which should form the basis for the respective spectacle lens. The representation can be present in encoded form or even in encrypted form.

In all of the products listed above, the instructions for using the spectacle lens may be available or conveyed orally, for example by an optician, in written form, for example in the form of a package slip, instructions or a product description, on a data medium in the form of computer-readable data or in the form of a data signal. By way of example, the instructions may comprise explanations regarding the suitability of the spectacle lens, for example for driving or as work spectacles. Furthermore, these instructions may comprise centration parameters. Provided the product is a representation of the respective spectacle lens in the form of computer-readable data on a data medium, the instructions for using the respective spectacle lens may likewise be available in the form of computer-readable data on this or any other data medium. Alternatively, the instructions for use may also be conveyed orally or be present in written form or in the form of a computer-readable data signal. Provided the product is a data medium with a virtual representation of the respective spectacle lens in the form of computer-readable data, the instructions for using the respective spectacle lens may likewise be available in the form of computer-readable data on this or a data medium. Alternatively, the instructions for use may be conveyed orally or be present in written form or in the form of a computer-readable data signal in this case, too. Provided the product is a representation of the respective spectacle lens in the form of a computer-readable data signal, the instructions for using the respective spectacle lens may likewise be available in the form of a computer-readable data signal. Alternatively, the instructions for use can be conveyed orally, be available in written form or be situated on a data medium in the form of computer-readable data in the latter case.

The instructions for using the respective spectacle lens denote, in particular, the position and orientation of the respective spectacle lens or of the spectacles in which the respective spectacle lens is used, in relation to the eyes and the face of the wearer while the spectacles are worn. By way of example, the use conditions can be specified by the "as-worn" pantoscopic angle pursuant to DIN EN ISO 13666:2013-10, section 5.18, the face form angle pursuant to DIN EN ISO 13666:2013-10, section 17.3 and the vertex distance pursuant to DIN EN ISO 13666:2013-10, section 5.27. Typical values for the "as-worn" pantoscopic angle range between −20 degrees and +30 degrees; typical values for the vertex distance range between 5 mm and 20 mm; and typical values for the face form angle range between −5 degrees and +30 degrees. In addition to the "as-worn" pantoscopic angle, the face form angle and the vertex distance, the use conditions, as a rule, also include the interpupillary distance pursuant to DIN EN ISO 13666:2013-10, section 5.29, i.e., the distance between the centers of the pupils when the eyes are fixating an object at an infinite distance in the straight-ahead position, and the centration data, i.e., the dimensions and distances required to center the respective spectacle lens in front of the eye, and the object distance model, which sets the object distance for which a certain point on the respective spectacle lens surface is optimized.

Pursuant to DIN EN ISO 13666:2013-10, section 5.18, the "as-worn" pantoscopic angle is the angle in the vertical plane between the normal to the front surface of a spectacle lens at its boxed center and the line of sight of the eye in the primary position, usually taken to be the horizontal. Pursuant to DIN EN ISO 13666:2013-10, section 17.3, the face form angle is the angle between the plane of the spectacle front and the plane of the right lens shape, or of the left lens shape. Pursuant to DIN EN ISO 13666:2013-10, section 5.27, the vertex distance is the distance between the back surface of the spectacle lens and the apex of the cornea, measured with the line of sight perpendicular to the plane of the spectacle front. Pursuant to DIN EN ISO 13666:2013-10, section 17.1, the plane of the lens shape is the plane tangential to the front surface of a plano or demonstration or dummy lens at its boxed center, when mounted in the frame.

Pursuant to DIN EN ISO 13666:2013-10, section 17.2, the plane of the spectacle front is the plane containing the two vertical centerlines of the right and left boxed lens shapes.

BRIEF DESCRIPTION OF THE DRAWINGS

The disclosure will now be described with reference to the drawings wherein.

DESCRIPTION OF EXEMPLARY EMBODIMENTS

Method according to the disclosure for producing a spectacle lens.

EXAMPLE 1

Figure 1:
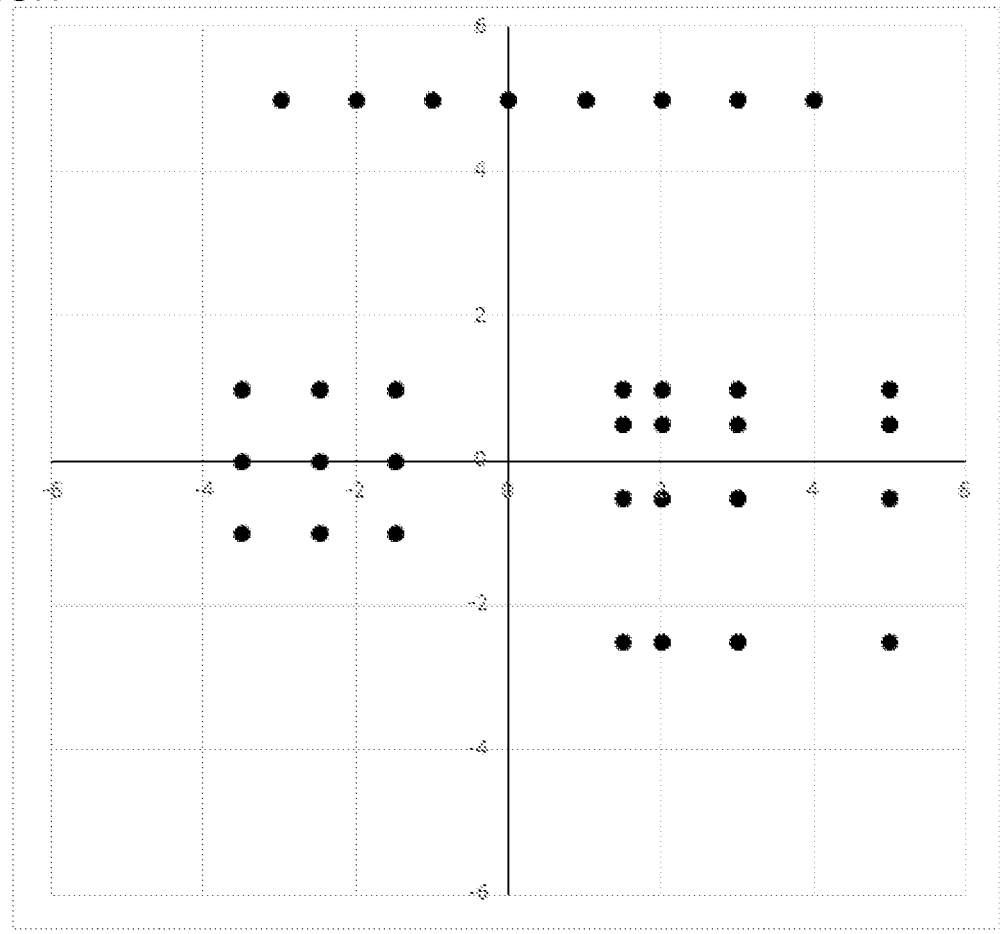
FIG. 1 shows test sample, with the dimensions given in millimeters.

A self-adhesive film (Superstik Premium MP, Satisloh AG) was perforated with a test pattern according to FIG. 1 using a laser (LSU 193, Trotec GmbH). The dimensions of the test sample are given in millimeters. This film with the test pattern was subsequently applied to the photochromic layer on the front surface of a photochromic semi-finished lens blank (ZEISS SF Freeform Puck 1.60 (MR8) Photofusion Gray without further protective layer, hardcoat layer and/or antireflection layer, Carl Zeiss Vision GmbH). Subsequently, 97% oleic acid was applied to the film on this semi-finished lens blank by means of a pipette and was distributed over the entire front surface with film by means of a cotton cloth soaked in 97% oleic acid. Subsequently, this semi-finished lens blank was exposed to xenon irradiation (270 W/m2) for 16 hours in the sample chamber of the Suntest XLS+ device (Atlas Material Testing Technology GmbH). Subsequently, the film was removed from the semi-finished lens blank and the surfaces of the semi-finished lens blank were cleaned using ethanol. A semi-finished lens blank which had, within a circular area with a radius of 0.75 mm, a continuous increase in the layer thickness of the photochromic layer up to a maximum of 2700 nm at each location on the front surface that corresponded to a perforation in the film was obtained.

EXAMPLE 2

A self-adhesive film (Superstik Premium MP, Satisloh AG) was perforated with a test pattern according to FIG. 1 using a laser (LSU 193, Trotec GmbH). This film with the test pattern was subsequently applied to the photochromic layer on the front surface of an uncut spectacle lens coated with a photochromic layer (ZEISS Single Vision Individual 1.6 PhotoFusion Gray without any further object-side coating) with a dioptric power of −2 dpt. Subsequently, 97% oleic acid was applied to the film on this spectacle lens by means of a pipette and was distributed over the entire film by means of a cotton cloth soaked in 97% oleic acid. Then, this spectacle lens was exposed for 16 hours in the sample chamber of the Suntest XLS+ device (Atlas Material Testing Technology GmbH) to a cycle of alternating xenon irradiation (270 W/m2) and flooding with DI (deionized) water under xenon irradiation (270 W/m2). Subsequently, the film was removed from the spectacle lens and the surfaces of the spectacle lens were cleaned using ethanol. A spectacle lens which had, within a circular area with a radius of 0.75 mm, a continuous increase in the layer thickness of the photochromic layer up to a maximum of 3500 nm at each location on the front surface that corresponded to a perforation in the film was obtained.

EXAMPLE 3

A laser (LSU 193, Trotec GmbH) was used to shoot the test pattern shown in FIG. 1 into the self-adhesive film (Superstik Premium MP, Satisloh AG). The film was bonded to the front surface of a spectacle lens (ZEISS Single Vision Superb 1.60 Photofusion Gray without further protective layer, hardcoat layer and/or antireflection layer, Carl Zeiss Vision GmbH) with the dioptric power of −2 dpt. Then, oleic acid (techn. 96%) was applied to the film with the pipette and was distributed with the aid of a cotton cloth. The front surface with film prepared thus was irradiated for two hours with xenon light in the sample chamber of the Suntest XLS+ device (Atlas Material Testing Technology GmbH) at 35° C., 275 W/m$^2$, filter plate window glass, with a cycle of 25 minutes irradiation/5 minutes irradiation and flooding with DI water. Subsequently, the film was removed and the front surface was cleaned using a cotton cloth soaked in ethanol (99%). Swellings or elevations with a height of 240 nm in the case of a width of 1 mm arose at the locations on the front surface that corresponded to the holes in the film. The swellings of neighboring positions are merged into one another at the close-together locations; see FIG. 2, which shows the height profile of a single and two connected swellings from example 3. These measurements were carried out using the NewView 7100 optical profilometer by Zygo Corporation based on white-light interferometry.

EXAMPLE 4

Figure 2:
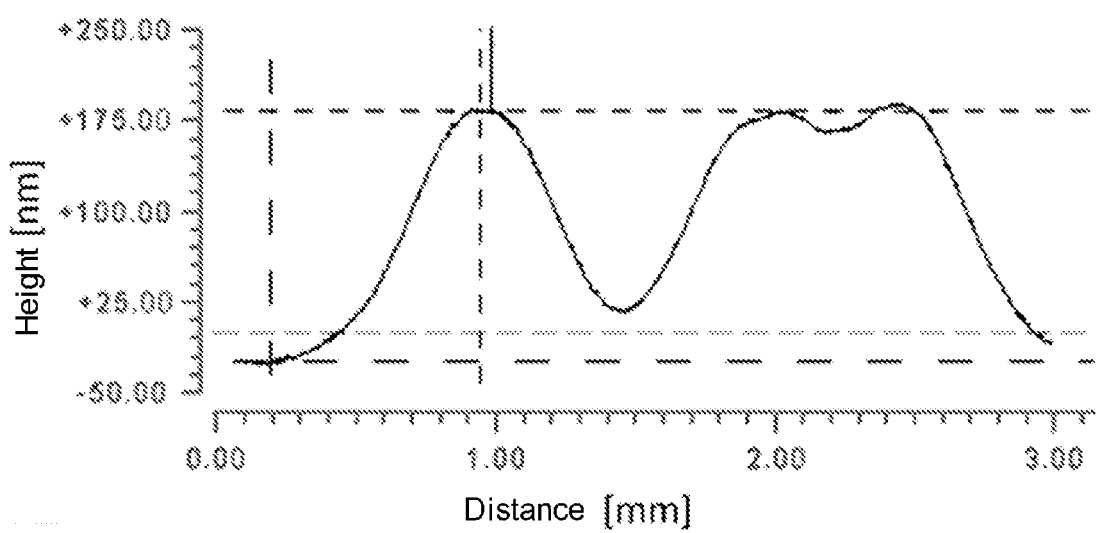
FIG. 2 shows the height profile of a single and two connected swellings from example 3.
Figure 3:
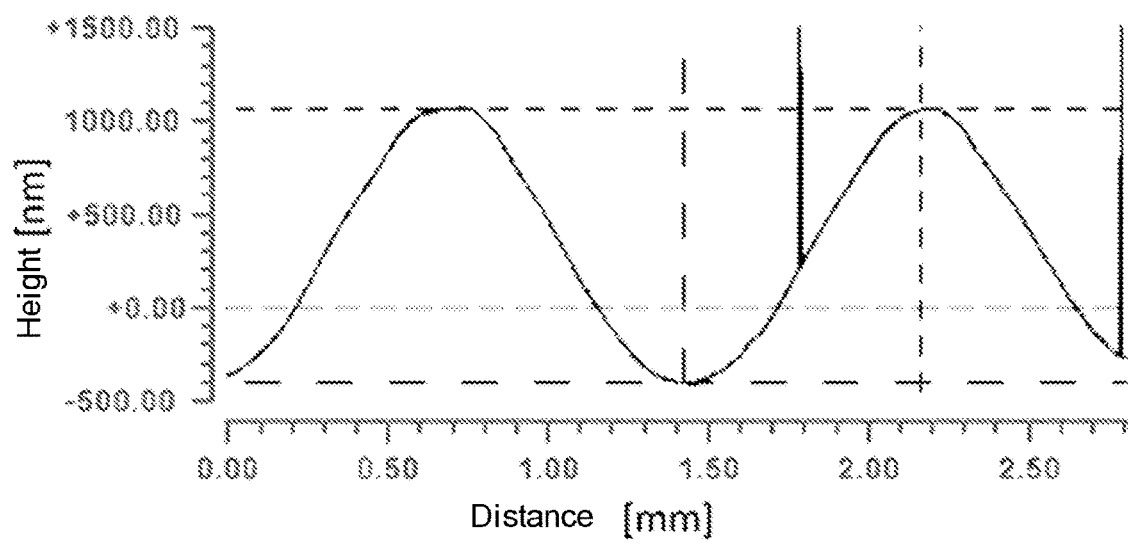
FIG. 3 shows the height profile of the swellings from example 4.

A laser (LSU 193, Trotec GmbH) was used to shoot the pattern defined in FIG. 2 of US 2017/0131567 A1 into an adhesive film (Superstik Premium MP, Satisloh AG). The film prepared thus was bonded to the front surface of a spectacle lens (ZEISS Single Vision Superb 1.60 Photofusion Gray without further protective layer, hardcoat layer and/or antireflection layer, Carl Zeiss Vision GmbH) with a dioptric power of −2.0 dpt. Then, oleic acid (techn. 96%) was applied to the film with the pipette and was distributed with the aid of a cotton cloth. The front surface with film prepared thus was irradiated for 18 hours in the sample chamber of the Suntest XLS+ device (Atlas Material Testing Technology GmbH) at 35° C. with 765 W/m$^2$ (filter plate window glass). Subsequently, the film was removed and the front surface was cleaned using a cotton cloth soaked in ethanol (99%). The elevations with a height of 1500 nm and a width of 1.45 mm, shown in FIG. 3, arose at the locations on the front surface that corresponded to the holes in the film. The elevations shown in FIG. 3, which show the height profile of the swellings from example 4, were recorded using the NewView 7100 optical profilometer by Zygo Corporation based on white-light interferometry.

EXAMPLE 5

Figure 4:
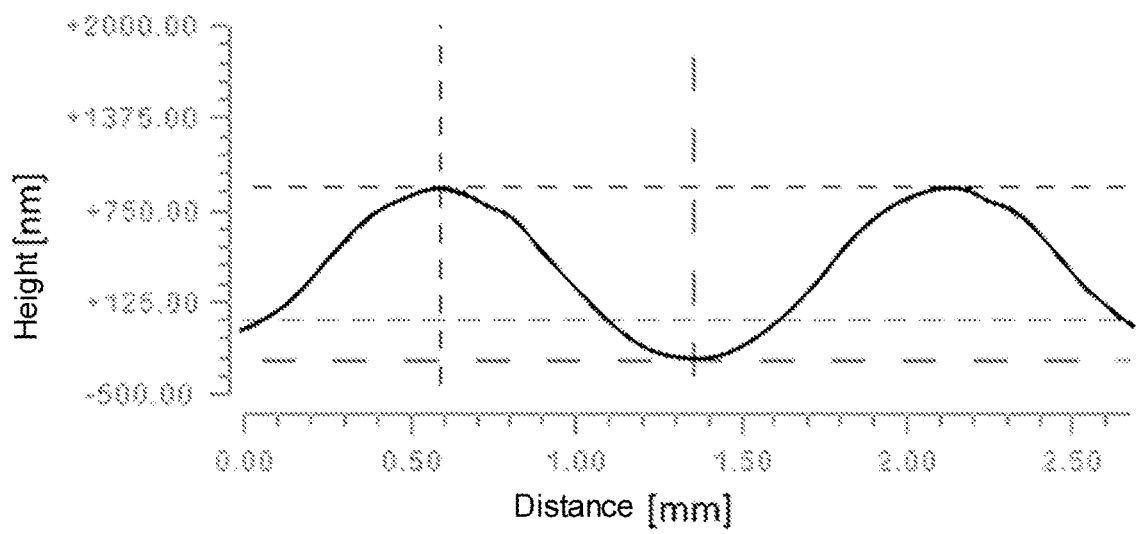
FIG. 4 shoes the height profile of the swellings from example 5.

A spectacle lens produced according to example 4 was coated with a composition according to example 2 of EP 2 578 649 A1 and with the antireflection layer described in paragraph [0056] of EP 2 801 846 A1. FIG. 4 shows the elevations which were recorded using the NewView 7100 optical profilometer by Zygo Corporation based on white-light interferometry. The elevations had a long-term stability of >8 months when stored at room temperature.

EXAMPLE 6

A Dimatix Printer 2850 inkjet printer was used to apply 30 oleic acid drops, 10 picoliter each, to each point of the front surface whose surface topography is intended to be changed of a ZEISS Single Vision Superb 1.60 Photofusion Gray spectacle lens without further protective layer, hardcoat layer and/or antireflection layer, Carl Zeiss Vision GmbH, and with a dioptric power of −2.0 dpt. The spectacle lens prepared thus was irradiated for 20 hours in the sample chamber of the Suntest XLS+ device at 35° C. with 765 W/m² (filter plate window glass). Subsequently, the spectacle lens was cleaned using a cotton cloth soaked in ethanol (99%). Swellings with a height of approximately 1350 nm and a lateral extent of 450 μm arose at the points where oleic acid was applied.

EXAMPLE 7

A Dimatix Printer 2850 inkjet printer 30 was used to apply an (acrylate-based) UV curing layer as a masking to each point of the front surface whose surface topography is intended not to be changed of a ZEISS Single Vision Superb 1.60 Photofusion Gray spectacle lens without further protective layer, hardcoat layer and/or antireflection layer, Carl Zeiss Vision GmbH, and with a dioptric power of 2.0 dpt. The masking layer was printed with 20-25 V at 40° C. and subsequently cured for 1 minute by means of a UV LED at a wavelength of 385 nm. Then, oleic acid (techn. 96%) was applied to the front surface with the pipette and was distributed with the aid of a cotton cloth. The front surface prepared thus was irradiated for 20 hours in the sample chamber of the Suntest XLS+ device at 35° C. with 765 W/m² (filter plate window glass). Subsequently, the spectacle lens was cleaned using a cotton cloth soaked in ethanol (99%). Swellings arose with a height of approximately 559 nm and a lateral extent of 980 μm.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

What is claimed is:

1. A method of manufacturing a spectacle lens having a substrate and at least one coating comprising the following steps in the order given below:

providing at least a substrate with a front surface and a back surface, coating or covering at least one of the surfaces of the at least one substrate, in full or in part, with at least one layer, contacting at least part of the surface of the at least one layer with at least one medium, and removing of the at least one medium, wherein the surface topography of the at least part of the surface of the at least one layer is changed by contacting with the at least one medium.

2. The method according to claim 1, wherein the change in the surface topography of the at least one layer:

is partially reversible and the change in the surface topography achieved with the at least one medium after the end of the contacting can change further, but can no longer return to the surface topography of the at least one layer before the contacting, or is irreversible.

3. The method according to claim 1, wherein the change of the surface topography of the at least one layer, which changes its surface topography by contacting with the at least one medium, is a diffusion process and the change of surface topography is not limited to those areas or those locations of the surface that are or will be brought into contact with the at least one medium.

4. The method according to claim 1, wherein the change in surface topography is a positive change in the surface topography in relation to the surface of the at least one layer prior to contacting with the at least one medium.

5. The method according to claim 4, wherein the changed surface of the at least one layer comprises at least two contiguous and/or at least two non-contiguous maxima both in the case of at least one local change and in the case of a full-area change in the surface topography.

6. The method according to claim 4, wherein for at least a local change in the surface topography of the at least one layer, its maximum lateral extent is in a range from 5 μm to 20 mm.

7. The method according to claim 4, wherein for at least a local change of the surface topography or a change of the surface topography over the entire surface of the at least one layer in relation to the unchanged surface of the at least one layer is in a range from 1 nm to 10 μm.

8. The method according to claim 4, wherein the local change in the surface topography of the at least one layer has an optical effect in a range from 0.2 dpt to 50 dpt.

9. The method according to claim 8, wherein each local change of the surface topography of the same surface of the at least one layer has an identical or have respectively different optical effects.

10. The method according to claim 1, wherein the surface topography of the at least one layer is changed locally or over the entire surface of the at least one layer.

11. The method according to claim 10, wherein the at least one local change in the surface topography is at least one short wavelength surface segment adjoining a long wavelength surface of the at least one layer.

12. The method according to claim 11, wherein the at least one short wavelength surface segment is a surface segment with a periodicity shorter than the smallest periodicity of the adjacent long wavelength surface of the at least one layer.

13. The method according to claim 1, further comprising:

coating or covering the front surface and the back surface of the at least one substrate, in full or in part, with the at least one layer, wherein the change of the surface topography of the front surface of the at least one layer is the same or different from the change of the surface topography of the back surface of the at least one layer.

14. The method according to claim 1, wherein the change in surface topography is a positive change in the surface topography.

15. The method according to claim 1, wherein before the at least one layer is brought into contact with the at least one medium, the surface of the at least one layer is covered with at least one masking means.

16. The method according to claim 15, wherein the at least one masking means is selected from the group consisting of at least one pressure-sensitive adhesive, at least one adhesive means, at least one coating, at least one photoresist or at least one film.

17. The method according to claim 15, wherein the at least one masking means comprises at least one coating which is identical or different from the at least one layer whose surface topography can be changed by contacting with the at least one medium.

18. The method according to claim 1, wherein for a covering of the entire surface of the substrate with the at least one layer, the surface thickness thereof has the same layer thickness or a different layer thickness over the entire surface.

19. The method according to claim 1, wherein the chemical composition of the at least one layer, which is provided over the entire area of the at least one surface of the substrate, is identical or different from one another over the entire surface.

20. The method according to claim 1, wherein the at least one layer is applied by means of an inkjet process.

21. The method according to claim 1, wherein the at least one medium is applied by means of an inkjet process.

22. The method according to claim 1, wherein contacting the same at least one layer whose surface topography can be changed by contacting with the at least one medium, occurs with an identical and/or a medium different from each other.

23. The method according to claim 1, wherein after the removal of the medium, the topographically altered surface of the at least one layer is covered with at least one further layer, and wherein the further layer has a chemical composition that is identical to or different from the at least one layer whose surface topography has been changed.

24. The method according to claim 1, wherein the change in the at least one layer by bringing it into contact with the at least one medium is a change in the surface topography caused by a diffusion process.

25. The method according to claim 1, wherein the changed surface topography of the at least one layer is changed over the entire area or locally.

26. A method of manufacturing a spectacle lens comprising a substrate and at least one coating, wherein the method comprises the following steps in the order given below:
provide at least a substrate with a front surface and a back surface,
coating or covering at least one of the surfaces of the substrate, in full or in part, with at least one layer, a surface topography of the at least one layer being changeable by contacting with at least one medium,
contacting at least part of the surface of the at least one layer with the at least one medium, wherein the surface topography of the at least one layer is changed, and
removing of the at least one medium.

27. The method according to claim 26, wherein the change of the surface topography takes place locally or over the entire surface.

28. A method of manufacturing a spectacle lens having a substrate and at least one coating, wherein the method comprises the following steps in the order given below:
providing at least one substrate with an uncoated or precoated front surface and an uncoated or precoated back surface,
fully or partially coating or covering at least one of the surfaces of the substrate with at least one layer, the surface of which has a surface topography and the surface topography of the at least one layer itself can be changed by bringing it into contact with at least one medium,
bringing at least part of the surface of the at least one layer into contact with the at least one medium, and
obtaining a spectacle lens comprising a substrate and at least one layer with a modified surface topography.

* * * * *

UNITED STATES PATENT AND TRADEMARK OFFICE
CERTIFICATE OF CORRECTION

PATENT NO. : 11,958,305 B2
APPLICATION NO. : 17/726469
DATED : April 16, 2024
INVENTOR(S) : Michel-Rene Christmann et al.

Page 1 of 2

It is certified that error appears in the above-identified patent and that said Letters Patent is hereby corrected as shown below:

On the Title Page

Item (56) Column 2, Line 19 In References Cited, U.S. PATENT DOCUMENTS, No. 22, 2017/0297955 A1: change "Gölge" to -- Glöge --

In the Specification

In Column 7, Line 14: change "and" to -- und --

In Column 7, Line 57: change "exemplay" to -- exemplary --

In Column 7, Line 59: change "exemplay" to -- exemplary --

In Column 8, Line 8: change "exemplay" to -- exemplary --

In Column 8, Line 15: change "exemplay" to -- exemplary --

In Column 11, Line 59: change "exemplay" to -- exemplary --

In Column 16, Line 56: change "c = chord" to -- C = chord --

In Column 18, Line 38: change "R6R73-nSi(OR5)n" to -- $R6R7_{(3-n)}Si(OR5)_n$ --

In Column 23, Line 16: change "exemplay" to -- exemplary --

In Column 28, Line 32: change "exemplay" to -- exemplary --

In Column 38, Lines 1 to 2: change "R1R23-nSi(OR3)n" to -- $R1R2_{(3-n)}Si(OR3)_n$ --

In Column 38, Lines 9 to 10: change "R1R23-nSi(OR3)n" to -- $R1R2_{(3-n)}Si(OR3)_n$ --

Signed and Sealed this
Sixth Day of August, 2024

Katherine Kelly Vidal
*Director of the United States Patent and Trademark Office*

CERTIFICATE OF CORRECTION (continued)
U.S. Pat. No. 11,958,305 B2

In Column 38, Line 21: change "R1R23-nSi(OR3)n" to -- $R1R2_{(3-n)}Si(OR3)_n$ --

In Column 38, Lines 30 to 31: change "R1R23-nSi(OR3)n" to -- $R1R2_{(3-n)}Si(OR3)_n$ --

In Column 38, Lines 33 to 34: change "R1R23-nSi(OR3)n" to -- $R1R2_{(3-n)}Si(OR3)_n$ --

In Column 47, Line 64: change "exemplay" to -- exemplary --

In Column 49, Line 24: change "exemplay" to -- exemplary --

In Column 50, Line 51: change "exemplay" to -- exemplary --

In Column 52, Line 10: change "exemplay" to -- exemplary --

In Column 53, Line 36: change "exemplay" to -- exemplary --

In Column 54, Line 62: change "exemplay" to -- exemplary --

In Column 55, Line 35: change "exemplay" to -- exemplary --

In Column 55, Line 36: change "exemplay" to -- exemplary --